United States Patent
Jiang et al.

(10) Patent No.: US 12,432,719 B2
(45) Date of Patent: Sep. 30, 2025

(54) UPLINK TRANSMISSION METHOD, UPLINK SCHEDULING METHOD, APPARATUSES THEREOF AND SYSTEM

(71) Applicant: FUJITSU LIMITED, Kawasaki (JP)

(72) Inventors: Qinyan Jiang, Beijing (CN); Guoyu Zhang, Beijing (CN); Meiyi Jia, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 537 days.

(21) Appl. No.: 17/476,607

(22) Filed: Sep. 16, 2021

(65) Prior Publication Data
US 2022/0007396 A1 Jan. 6, 2022

Related U.S. Application Data

(63) Continuation of application No. PCT/CN2019/080680, filed on Mar. 29, 2019.

(51) Int. Cl.
*H04W 72/1268* (2023.01)
*H04W 72/044* (2023.01)

(52) U.S. Cl.
CPC ..... *H04W 72/1268* (2013.01); *H04W 72/044* (2013.01)

(58) Field of Classification Search
None
See application file for complete search history.

(56) References Cited

U.S. PATENT DOCUMENTS

| 2018/0124790 A1 | 5/2018 | Yerramalli | |
| 2018/0352537 A1* | 12/2018 | Zhang | H04W 72/04 |
| 2018/0367282 A1 | 12/2018 | Li et al. | |
| 2019/0132103 A1 | 5/2019 | Yang et al. | |
| 2020/0053777 A1* | 2/2020 | Babaei | H04W 72/04 |
| 2020/0068546 A1 | 2/2020 | Wu et al. | |
| 2020/0145169 A1* | 5/2020 | Zhou | H04W 72/20 |
| 2020/0154399 A1 | 5/2020 | Zhu et al. | |

(Continued)

FOREIGN PATENT DOCUMENTS

| CN | 106658742 A | 5/2017 |
| CN | 106992804 A | 7/2017 |

(Continued)

OTHER PUBLICATIONS

Extended European search report with the supplementary European search report and the European search opinion Issued by the European Patent Office for corresponding European Patent Application No. 19922445.2-1215, mailed on Mar. 11, 2022.

(Continued)

*Primary Examiner* — Saumit Shah
(74) *Attorney, Agent, or Firm* — Myers Wolin, LLC

(57) ABSTRACT

An uplink transmission method, an uplink scheduling method, apparatuses thereof and a system. The uplink transmission method includes: a terminal equipment performs channel detection on two or more bandwidth units of a carrier; and transmits uplink transmission on at least one bandwidth unit according to a result of the channel detection by the terminal equipment, the at least one bandwidth unit being detected as being idle. The terminal equipment may perform channel detection on two or more bandwidth units of a carrier, and determine whether the bandwidth units are busy or idle.

13 Claims, 10 Drawing Sheets

```
┌─────────────────────────────────────────────────────────┐  ─201
│ a terminal equipment performs channel detection on two  │
│         or more bandwidth units of a carrier            │
└─────────────────────────────────────────────────────────┘
                           │
                           ▼                               ─202
┌─────────────────────────────────────────────────────────┐
│ the terminal equipment transmits uplink transmission on │
│ at least one bandwidth unit according to a result of the│
│ channel detection, the at least one bandwidth unit being│
│                 detected as being idle                  │
└─────────────────────────────────────────────────────────┘
```

(56) References Cited

U.S. PATENT DOCUMENTS

| | | | |
|---|---|---|---|
| 2020/0213066 A1* | 7/2020 | Ma | H04L 43/0876 |
| 2020/0236677 A1* | 7/2020 | Cui | H04W 72/23 |
| 2020/0314809 A1* | 10/2020 | Zhang | H04W 72/04 |
| 2021/0014894 A1* | 1/2021 | Li | H04W 72/1273 |
| 2021/0127419 A1* | 4/2021 | Zhang | H04W 74/0808 |

FOREIGN PATENT DOCUMENTS

| | | |
|---|---|---|
| CN | 108810905 A | 11/2018 |
| CN | 109275191 A | 1/2019 |
| WO | 2017/197166 A1 | 11/2017 |

OTHER PUBLICATIONS

Orfanos et al., "Development and Performance Evaluation of an Adaptive MAC Protocol for MC-CDMA Wireless LANs with QoS Support", 2006, XP002761509, with English abstract.

Orfanos, G., "Development and Performance Evaluation of an Adaptive MAC Protocol for MC-CDMA Wireless LANs with QoS Support", "Centralized Mode of the C-DCF", 2006, pp. 171-178, XP002610372, vol. 52.

VIVO, "Analysis on the feasibility and technical restrictions of dual registration", Agenda Item: 10.2.20, 3GPP TSG-RAN WG2 Meeting #100, R2-1712995, revision of R2-1710927, Reno, USA, Nov. 27-Dec. 1, 2017.

International Search Report and Written Opinion of the International Searching Authority issued by China National Intellectual Property Administration for the International Patent Application No. PCT/CN2019/080680, mailed on Dec. 17, 2019, with English translation.

Huawei et al., "NRU wideband BWP operation", 3GPP TSG RAN WG1 Meeting #96, Agenda Item: 7.2.2.2.5, R1-1901529, Athens, Greece, Feb. 25-Mar. 1, 2019.

Nokia et al., "On wideband operation in NR-U", 3GPP TSG RAN WG1 Meeting #96, Agenda item: 7.2.2.2.5, R1-1902437, Athens, Greece, Feb. 25-Mar. 1, 2019.

First Notification of Office Action and Search Report issued by the China National Intellectual Property Administration for corresponding Chinese Patent Application No. 201980093867.7, mailed on May 25, 2023, with an English translation.

Charter Communications, "Channel access for UL transmissions", Agenda Item: 7.2.2.4.1, 3GPP TSG-RAN WG1 Meeting #95, R1-1813381, Spokane, USA, Nov. 12-16, 2018.

Notice of Reasons for Refusal issued by the Japan Patent Office for corresponding Japanese Patent Application No. 2021-557111, mailed on Oct. 18, 2022, with an English translation.

LG Electronics Inc., "MAC impacts of multiple CCAs in wide band operation", Agenda Item: 11.2.1.2 (NR_unlic-Core), 3GPP TSG-RAN WG2 Meeting #105, R2-1901760, Athens, Greece, Feb. 25-Mar. 1, 2019.

Spreadtrum Communications, "Discussion on UL Signals and Channels in NR-U", Agenda Item: 7.2.2.3.2, 3GPP TSG-RAN WG1 Meeting #94bis, R1-1811021, Chengdu, China, Oct. 8-12, 2018.

VIVO, "Discussion on wideband operation in NR-U", Agenda Item: 7.2.2.2.5, 3GPP TSG-RAN WG1 Meeting #96, R1-1901679, Athens, Greece, Feb. 25-Mar. 1, 2019.

VIVO, "Discussion on physical UL channel design in NR unlicensed", Agenda Item: 7.2.2.3.2, 3GPP TSG-RAN WG1 Meeting #94, R1-1808236, Gothenburg, Sweden, Aug. 20-24, 2018.

Huawei et al., "HARQ enhancements in NR unlicensed", Agenda Item: 7.2.2.2.3, 3GPP TSG-RAN WG1 Ad-Hoc Meeting 1901, R1-1900062, Taipei, Jan. 21-25, 2019.

OPPO, "BWP switching due to LBT", Agenda Item: 11.2.1.2, 3GPP TSG-RAN WG2 Meeting #104, R2-1816265, resubmission of R2-1813589, Spokane, USA, Nov. 12-16, 2018.

Interdigital, "Random access in NR-Unlicensed", Agenda Item: 11.2.1.1, 3GPP TSG-RAN WG2 Meeting #105, R2-1901456, Revision of R2-1816776, Athens, Greece, Feb. 25-Mar. 1, 2019.

Notice of Reasons for Refusal issued by the Japan Patent Office for corresponding Japanese Patent Application No. 2023-117110, mailed on Feb. 25, 2025, with an English translation.

Intel Corporation, "Enhancements to initial access and mobility for NR-unlicensed", Agenda Item: 7.2.2.2.2, 3GPP TSG RAN WG1 Meeting #96, R1-1903322, Athens, Greece, Feb. 25-Mar. 1, 2019, cited in JPOA.

* cited by examiner

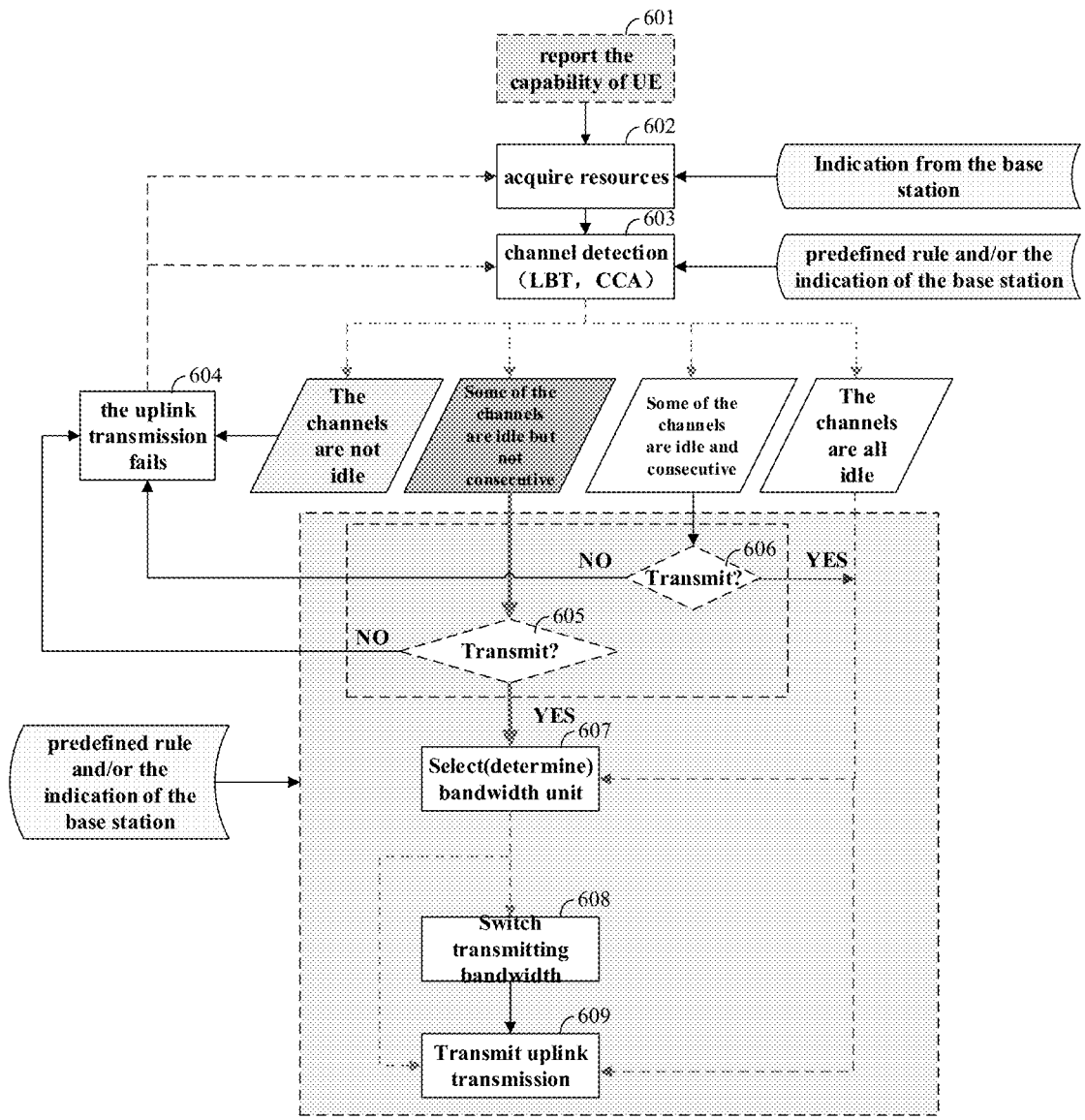

FIG. 6

701 a network device transmits at least one piece of first indication information to a terminal equipment, the at least one piece of first indication information indicating at least one resource capable of being used for uplink transmission, the at least one resource corresponding to at least one bandwidth unit in two or more bandwidth units of a carrier in the frequency domain

FIG. 7

801 a network device transmits second indication information to a terminal equipment, the second indication information being related to how the terminal equipment judges whether to transmit the uplink transmission

FIG. 8

901 a network device transmits third indication information to a terminal equipment, the third indication information being related to how the terminal equipment selects the at least one bandwidth unit from the bandwidth units detected as being idle

FIG. 9

1001 a network device transmits fourth indication information to a terminal equipment, the fourth indication information being related to whether the terminal equipment switches a transmission bandwidth before transmitting the uplink transmission

FIG. 10

1101 a network device exchanges information with other network devices to coordinate resources, the information being related to channel detection and/or data reception and transmission method adopted by the network device and/or the terminal equipment served by the network device

FIG. 11

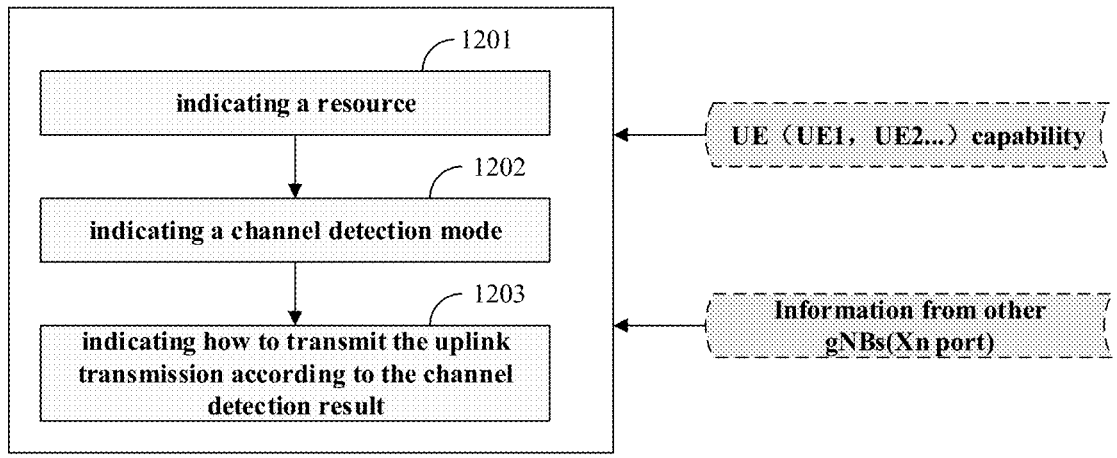

FIG. 12

UPLINK TRANSMISSION METHOD, UPLINK SCHEDULING METHOD, APPARATUSES THEREOF AND SYSTEM

CROSS-REFERENCE TO RELATED APPLICATION

This application is a continuation application of International Application PCT/CN2019/080680 filed on Mar. 29, 2019 and designated the U.S., the entire contents of which are incorporated herein by reference.

FIELD

This disclosure relates to the field of communications, and in particular to an uplink transmission method, an uplink scheduling method, apparatuses thereof and a system.

BACKGROUND

In an unlicensed frequency band, considering frequency band regulatory requirements and network coexistence, a terminal equipment may need to detect whether a channel is idle or busy before transmitting data, and may transmit data only when the channel is idle. For example, the terminal equipment detects energy or signal before transmitting data, and deems that the channel is idle when the energy is lower than a threshold or no signal is detected.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in license assisted access of long term evolution (LTE-LAA), a carrier bandwidth is 20 MHz or 10 MHz. For an uplink transmission, a terminal equipment determines whether a corresponding channel is idle or busy by detecting a carrier (LAA Scell), and performs transmission on the carrier. However, in NR-based access to unlicensed spectrum (NR-U), a bandwidth of a carrier may be greater than 20 MHz, such as 40 MHz or 80 MHz, and the terminal equipment may perform channel detection on two or more bandwidth units of a carrier to determine whether the bandwidth units are busy or idle, so that the terminal equipment may start or complete data transmission more fast. Therefore, channel detection and uplink transmission methods in LTE-LAA cannot be directly applied to such a scenario.

In order to solve at least one of the above problems other similar problems, embodiments of this disclosure provide an uplink transmission method, an apparatus thereof and a communication system.

According to a first aspect of the embodiments of this disclosure, there is provided an uplink transmission method, applicable to a terminal equipment, the method including:
  a terminal equipment performs channel detection on two or more bandwidth units of a carrier; and
  the terminal equipment transmits an uplink transmission on at least one bandwidth unit according to a result of the channel detection, the at least one bandwidth unit being detected as being idle.

According to a second aspect of the embodiments of this disclosure, there is provided an uplink scheduling method, applicable to a network device, the method including:
  a network device transmits at least one piece of first indication information to a terminal equipment, the at least one piece of first indication information indicating at least one resource capable of being used for an uplink transmission, the at least one resource corresponding to at least one bandwidth unit in two or more bandwidth units of a carrier in the frequency domain, the terminal equipment performing channel detection on the two or more bandwidth units, and transmitting an uplink transmission on at least one bandwidth unit according to a result of the channel detection, the at least one bandwidth unit being detected as being idle.

According to a third aspect of the embodiments of this disclosure, there is provided an uplink scheduling method, applicable to a network device, the method including:
  a network device transmits second indication information to a terminal equipment, the second indication information being related to how a terminal equipment judges whether to transmit an uplink transmission, and the terminal equipment judging whether to transmit an uplink transmission according to the second indication information.

According to a fourth aspect of the embodiments of this disclosure, there is provided an uplink scheduling method, applicable to a network device, the method including:
  a network device transmits third indication information to a terminal equipment, the third indication information being related to how a terminal equipment selects at least one bandwidth unit from bandwidth units detected as being idle, and the terminal equipment selecting at least one bandwidth unit from bandwidth units detected as being idle according to the third indication information, and transmitting an uplink transmission on the selected at least one bandwidth unit.

According to a fifth aspect of the embodiments of this disclosure, there is provided an uplink scheduling method, applicable to a network device, the method including:
  a network device transmits fourth indication information to a terminal equipment, the fourth indication information being related to whether the terminal equipment switches a transmission bandwidth before transmitting an uplink transmission, and the terminal equipment switching a transmission bandwidth or not switching a transmission bandwidth before transmitting an uplink transmission according to the fourth indication information.

According to a sixth aspect of the embodiments of this disclosure, there is provided an uplink transmission apparatus, configured in a terminal equipment, the apparatus including:
  a detecting unit configured to perform channel detection on two or more bandwidth units of a carrier; and
  a first transmitting unit configured to transmit an uplink transmission on at least one bandwidth unit according to a result of the channel detection, the at least one bandwidth unit being detected as being idle.

According to a seventh aspect of the embodiments of this disclosure, there is provided an uplink scheduling apparatus, configured in a network device, the apparatus including:
  a transmitting unit configured to transmit at least one piece of first indication information to a terminal equipment, the at least one piece of first indication information indicating at least one resource capable of being used for an uplink transmission, the at least one resource corresponding to at least one bandwidth unit in two or more bandwidth units of a carrier in the frequency domain, the terminal equipment performing channel detection on the two or more bandwidth units, and transmitting an uplink transmission on at least one bandwidth unit according to a result of the channel detection, the at least one bandwidth unit being detected as being idle.

According to an eighth aspect of the embodiments of this disclosure, there is provided an uplink scheduling apparatus, configured in a network device, the apparatus including:

a transmitting unit configured to transmit second indication information to a terminal equipment, the second indication information being related to how a terminal equipment judges whether to transmit an uplink transmission, and the terminal equipment judging whether to transmit an uplink transmission according to the second indication information.

According to a ninth aspect of the embodiments of this disclosure, there is provided an uplink scheduling apparatus, configured in a network device, the apparatus including:

a transmitting unit configured to transmit third indication information to a terminal equipment, the third indication information being related to how a terminal equipment selects at least one bandwidth unit from bandwidth units detected as being idle, and the terminal equipment selecting at least one bandwidth unit from bandwidth units detected as being idle according to the third indication information, and transmitting an uplink transmission on the selected at least one bandwidth unit.

According to a tenth aspect of the embodiments of this disclosure, there is provided an uplink scheduling apparatus, configured in a network device, the apparatus including:

a transmitting unit configured to transmit fourth indication information to a terminal equipment, the fourth indication information being related to whether the terminal equipment switches a transmission bandwidth before transmitting an uplink transmission, and the terminal equipment switching a transmission bandwidth or not switching a transmission bandwidth before transmitting an uplink transmission according to the fourth indication information.

According to an eleventh aspect of the embodiments of this disclosure, there is provided a terminal equipment, including the apparatus as described in the sixth aspect.

According to a twelfth aspect of the embodiments of this disclosure, there is provided a network device, including the apparatus as described in any one of the seventh to the tenth aspects.

According to a thirteenth aspect of the embodiments of this disclosure, there is provided a communication system, including the network device as described in the twelfth aspect and the terminal equipment as described in the eleventh aspect.

According to another aspect of the embodiments of this disclosure, there is provided a computer readable program, which, when executed in a terminal equipment, will cause a computer to carry out the method described in the first aspect in the terminal equipment.

According to a further aspect of the embodiments of this disclosure, there is provided a storage medium storing a computer readable program, which will cause a computer to carry out the method described in the first aspect in a terminal equipment.

According to yet another aspect of the embodiments of this disclosure, there is provided a computer readable program, which, when executed in a network device, will cause a computer to carry out the method described in any one of the second to the fifth aspects in the network device.

According to still another aspect of the embodiments of this disclosure, there is provided a storage medium storing a computer readable program, which will cause a computer to carry out the method described in any one of the second to the fifth aspects in a network device.

An advantage of the embodiments of this disclosure exists in that according to at least one aspect of the embodiments of this disclosure, the terminal equipment may perform channel detection on two or more bandwidth units of a carrier, and determine whether the bandwidth units are busy or idle, thereby starting or completing data transmission more fast.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 6 is another schematic diagram of the uplink transmission method of Embodiment 1;

FIG. 7 is a schematic diagram of the uplink scheduling method of Embodiment 2;

FIG. 8 is another schematic diagram of the uplink scheduling method of Embodiment 2;

FIG. 9 is a further schematic diagram of the uplink scheduling method of Embodiment 2;

FIG. 10 is still another schematic diagram of the uplink scheduling method of Embodiment 2;

FIG. 11 is yet another schematic diagram of the uplink scheduling method of Embodiment 2;

FIG. 12 is yet still another schematic diagram of the uplink scheduling method of Embodiment 2;

DETAILED DESCRIPTION

Figure 1:
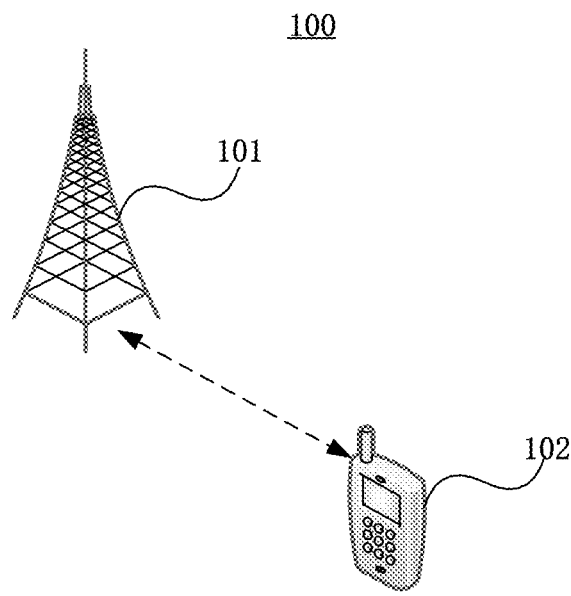
FIG. 1 is schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication system protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, equipment accessing to a communication network and receiving network services via a network device, and may also be referred to as "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, the communication system 100 may include a network device 101 and a terminal equipment 102. For the sake of simplicity, an example having only one terminal equipment is schematically given in FIG. 1. And the network device 101 is, for example, a network device gNB of NR.

In the embodiment of this disclosure, existing traffics or traffics that may be implemented in the future may be performed between the network device 101 and the terminal equipment 102. For example, such traffics may include but not limited to enhanced mobile broadband (eMBB), massive machine type communication (MTC), and ultra-reliable and low-latency communication (URLLC), etc.

The terminal equipment 102 may transmit data to the network device 101, for example, in a grant-free transmission mode. The network device 101 may receive data transmitted by one or more terminal equipments 102, and feedback information (such as acknowledgement ACK/non-acknowledgement NACK) to the terminal equipment 102, and the terminal equipment 102 may acknowledge terminating a transmission process, or may further perform new data transmission, or may perform data retransmission, according to the feedback information.

For the sake of easy understanding, some concepts involved in the embodiments of this disclosure shall be described below in brief.

For example, channel detection (or channel listening or channel sensing) described below refers to detecting (listening to or sensing) a channel to determine whether the channel is idle or busy, which may also be referred to as channel access, or listen-before-talk (LBT), or clear channel assessment (CCA).

For another example, a bandwidth unit described below may be referred to as a BWP sub-band, a channel access sub-band, an LBT sub-band, a CCA sub-band, a channel detection or listening or sensing sub-band, or a sub-band, etc.

For a further example, uplink transmission (UL transmission) described below may be a UL burst, the UL burst including an uplink channel and/or an uplink signal (PRACH/PUCCH/PUSCH/SRS), etc.

For still another example, RRC signaling described below may also be an RRC message. The RRC signaling or RRC message may include system information or a system message, such as an MIB, and an SIB, etc., and may further include RRC messages as cell-specific, group-specific or UE-specific, etc., and specific RRC IEs therein. MAC signaling described below may be an MAC CE, etc. Physical layer signaling described below may be DCI, which refers to downlink control information. A UL grant described below refers to an uplink grant or uplink license indicated via physical layer signaling or MAC signaling. CG described below refers to a configured grant or a configured license. "Selecting" described below may also be "determining". "Judging" described below may also be "determining". And "corresponding" described below may also be "associating".

Implementations of the embodiments of this disclosure shall be described below with reference to the accompanying drawings. These implementations are illustrative only, and are not intended to limit this disclosure.

Embodiment 1

Figure 2:
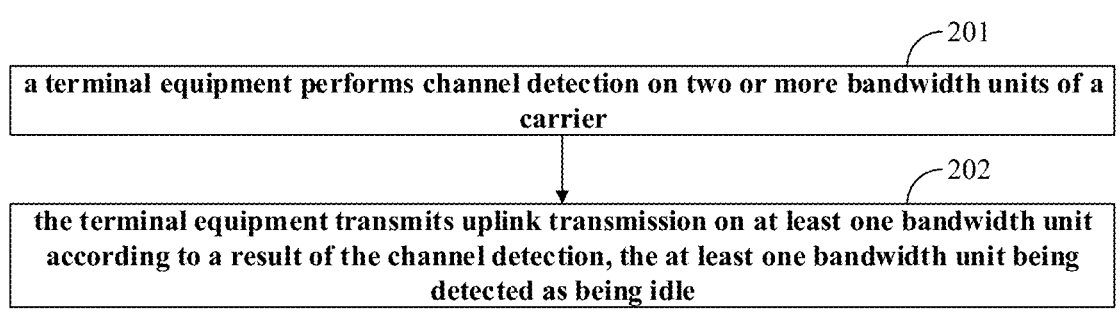
FIG. 2 is a schematic diagram of the uplink transmission method of Embodiment 1.

The embodiment of this disclosure provides an uplink transmission method, applicable to a terminal equipment, such as the UE, etc., as described above. FIG. 2 is a schematic diagram of the uplink transmission method of this embodiment. As shown in FIG. 2, the method includes:
  step 201: a terminal equipment performs channel detection on two or more bandwidth units of a carrier; and
  step 202: the terminal equipment transmits uplink transmission on at least one bandwidth unit according to a result of the channel detection, the at least one bandwidth unit being detected as being idle.

In this embodiment, the terminal equipment may perform channel detection on two or more bandwidth units of a carrier, and determine whether the bandwidth units are busy or idle, thereby starting or completing data transmission more fast.

In this embodiment, the above two or more bandwidth units are on a BWP of the above carrier, and the BWP may be an active BWP.

Figure 3A:
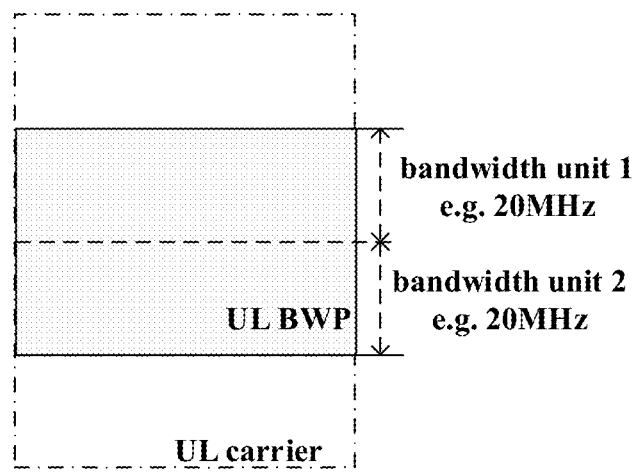
FIGS. 3A-3C are schematic diagrams of a correspondence relationship between bandwidth units and carriers.
Figure 3B:
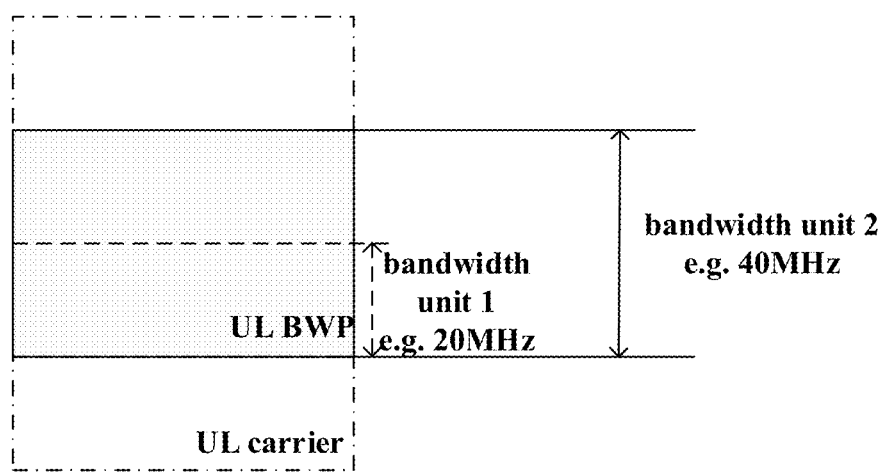
Figure 3C:
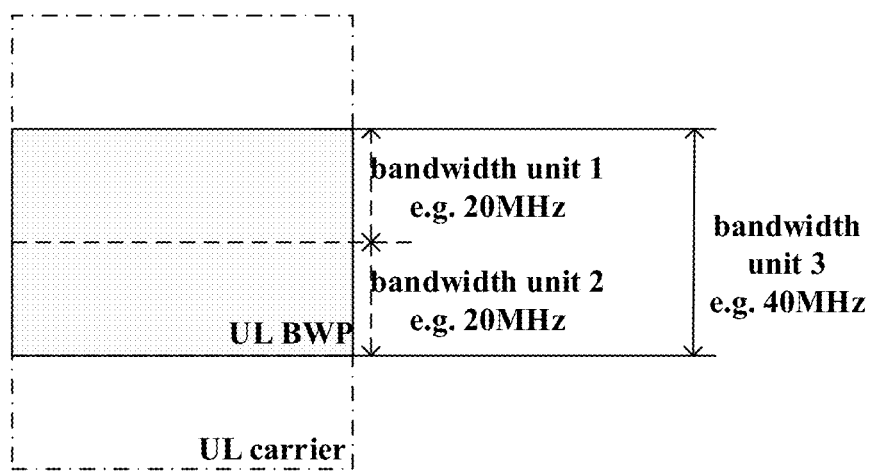

FIGS. 3A-3C are schematic diagrams of a correspondence relationship between bandwidth units and carriers. As shown in FIG. 3A, in this example, an uplink carrier (UL carrier) includes two bandwidth units, namely, bandwidth unit 1 and bandwidth unit 2, and these two bandwidth units are on a UL BWP, and the UL BWP is an active BWP, and these two bandwidth units do not overlap in the frequency domain. As shown in FIG. 3B, in this example, an uplink carrier (UL carrier) includes two bandwidth units, namely, bandwidth unit 1 and bandwidth unit 2, and these two bandwidth units are on a UL BWP, and the UL BWP is an active BWP, these two bandwidth units partially overlap in the frequency domain. As shown in FIG. 3C, in this example, an uplink carrier (UL carrier) includes three bandwidth units, namely, bandwidth units 1-3, and these three bandwidth units are on a UL BWP, which is an active BWP, and bandwidth unit 1 and bandwidth unit 2 do not overlap in the frequency domain, while bandwidth unit 3 overlaps with bandwidth units 1 and 2 respectively. The correspondence relationships in FIGS. 3A-3C are examples only, and this embodiment is not limited thereto.

In one implementation, the terminal equipment may receive an indication of the network device to learn resources available for uplink transmission. For example, the terminal equipment may receive at least one piece of indication information (referred to as first indication information) transmitted by the network device, the at least one piece of first indication information indicating at least one resource that can be used for uplink transmission. The at least one resource is a resource of CG or a resource of a UL grant.

In this implementation, a resource refers to a time-frequency resource used for or corresponding to a complete uplink transmission. The complete uplink transmission here means that the network device may normally receive data or detection signals.

For example, if a resource is used to transmit a physical random access channel (PRACH) or a signal, the resource refers to a time-frequency resource corresponding to a random access channel (RACH) occasion (RO), that is, the time-frequency resource is able to transmit a complete preamble or random access request, and the network device may transmit a downlink signal and/or channel corresponding thereto according to the preamble or random access request, such as a PDCCH, and a PDSCH, etc.; if a resource is used to transmit a physical uplink shared channel (PUSCH) or a signal, the resource refers to a time-frequency resource corresponding to a transport block (TB); if a resource is used to transmit a physical uplink control channel (PUCCH) or a signal, the resource refers to a time-frequency resource corresponding to a piece of uplink control information (UCI); and if a resource is used to transmit a sounding reference signal (SRS), the resource refers to a time-frequency resource corresponding to an SRS sequence.

In this implementation, the above at least one piece of first indication information may be one or multiple. For example, when the above at least one resource is two or more than two, these two or more resources may be used to transmit identical signals and/or channels, for example, they are all used to transmit PRACHs, or are used to transmit PUSCHs, etc., in which case the above two or more resources may be indicated by the same first indication information, such as being indicated by the same physical layer signaling.

In this implementation, the at least one resource may correspond to at least one of the two or more bandwidth units of the carrier in the frequency domain. For example, the at least one bandwidth unit to which the at least one resource corresponds in the frequency domain is two or more bandwidth units, the at least one resource may be two or more resources, and time-domain starting positions of the at least one resource are identical.

For another example, the at least one bandwidth unit to which the at least one resource corresponds in the frequency domain is two or more bandwidth units, the at least one resource is one resource, and time-domain starting positions of parts of the resource corresponding to different bandwidth units are identical.

Figure 4A:
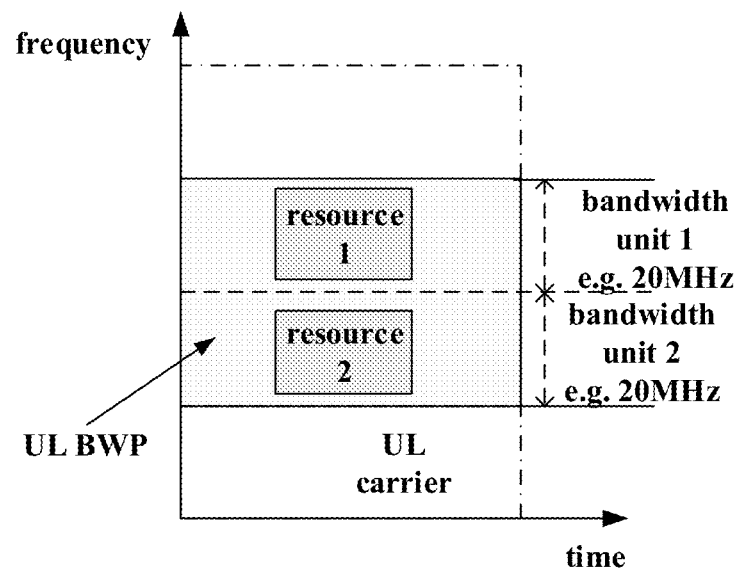
FIGS. 4A-4B are schematic diagrams of a correspondence relationship between resources and bandwidth units.
Figure 4B:
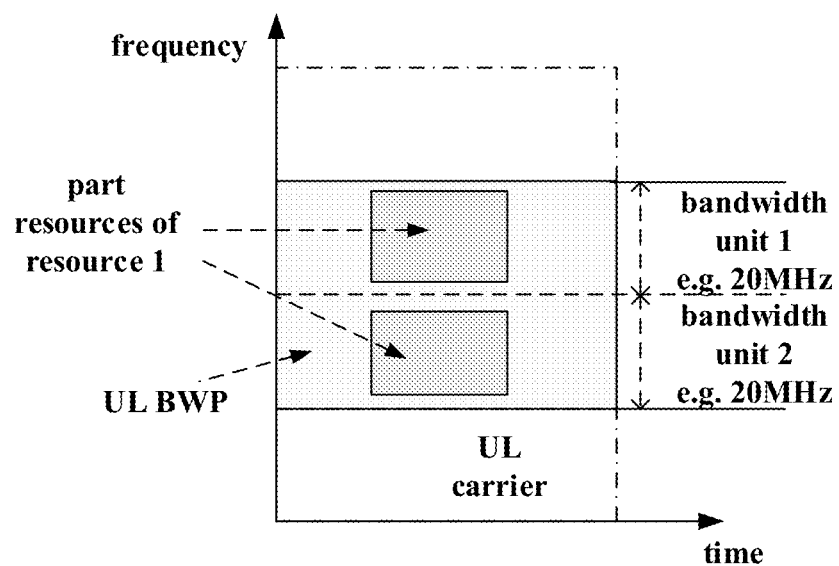

FIGS. 4A-4B are schematic diagrams of a correspondence relationship between resources and bandwidth units. As shown in FIG. 4A, in this example, two resources correspond respectively to a bandwidth unit in the frequency domain, and time-domain starting positions of the two resources are identical. As shown in FIG. 4B, in this example, two parts of the resource correspond respectively to a bandwidth unit, and time-domain starting positions of the two parts are identical. FIGS. 4A and 4B are examples only, which are not limited in this embodiment. For example, it may be that one resource (such as resource 1 or resource 2 shown in FIG. 4A) corresponds to one bandwidth unit, and another resource is as shown by resource 1 in FIG. 4B, and its two or more parts correspond respectively to one bandwidth unit.

In this embodiment, in step 201, the terminal equipment may determine channel detection modes of the bandwidth units according to the indication of the network device, or may determine channel detection modes of the bandwidth units according to a capability of its own, which are not limited in this embodiment.

In this embodiment, the bandwidth units may correspond to the following two channel detection modes: channel detection with a fixed length of time, and channel detection based on a random backoff mechanism.

For example, the bandwidth units may all correspond to the channel detection mode with a fixed length of time, and the terminal equipment performs channel detection based on a fixed time length on the two or more bandwidth units.

For another example, one of the bandwidth units corresponds to the channel detection mode based on a random backoff mechanism, and the other bandwidth units correspond to the channel detection mode with a fixed time length. The terminal equipment performs channel detection based on the random backoff mechanism on one of the two or more bandwidth units, and performs channel detection with a fixed time length on other bandwidth units in the two or more bandwidth units.

In this embodiment, reference may be made to the related art for particular implementations of the channel detection with a fixed time length and the channel detection based on a random backoff mechanism, which shall not be described herein any further.

In this embodiment, in step 202, the terminal equipment may transmit the uplink transmission according to at least one item of the following: the number of bandwidth units detected as being idle in the two or more bandwidth units; positions of bandwidth units detected as being idle in the two or more bandwidth units; whether bandwidth units detected as being idle in the two or more bandwidth units satisfy a condition; and signals and/or channels included in the uplink transmission.

In an implementation of step 202, the terminal equipment may determine whether to transmit the uplink transmission according to the at least one item, and transmit the uplink transmission if it is judged yes.

In this implementation, the terminal equipment may also receive indication information (referred to as second indication information) transmitted by the network device, the second indication information being related to how the terminal equipment determines whether to transmit the uplink transmission according to the above at least one item, that is, the terminal equipment may refer to the second indication information and determine whether to transmit the uplink transmission according to the at least one item.

In this implementation, that the terminal equipment determines whether to transmit the uplink transmission according to the number and/or the positions of the bandwidth units detected as being idle in the two or more bandwidth unit is taken as an example.

In this example, the network device may instruct the terminal equipment via the above second indication information how to judge whether to transmit the uplink transmission according to the number and/or the positions of the bandwidth units detected as being idle, and the terminal equipment performs corresponding processing according to the instruction of the second indication information.

For example, the second indication information indicates that the uplink transmission may be transmitted when all bandwidth units (two or more bandwidth units of the carrier) are idle, and the terminal equipment judges whether all the bandwidth units are detected as being idle, and if it is judged yes, it transmits the uplink transmission. For example, assuming that there are N bandwidth units in total, in which M bandwidth units are detected as being idle, the terminal equipment may transmit the uplink transmission when N=M.

For another example, the second indication information indicates that the uplink transmission may be transmitted when some bandwidth units are idle and in which at least two idle bandwidth units are consecutive, and the terminal equipment judges whether at least two bandwidth units are consecutive in the idle bandwidth units, if it is judged as yes, the uplink transmission is transmitted. For example, assuming that there are N bandwidth units in total, in which M bandwidth units are detected as being idle, the terminal equipment may transmit the uplink transmission when N>M, M$\geqslant$1 and the bandwidth units are consecutive when M$\geqslant$2. At this moment, N and M may be equal, that is N=M, in which case the terminal equipment may also transmit the uplink transmission.

For a further example, the second indication information indicates that the uplink transmission may be transmitted when a part of the bandwidth units is idle, and the terminal equipment judges whether there is an idle bandwidth unit, and if it is judged yes, the uplink transmission is transmitted. For example, assuming that there are N bandwidth units in total, in which M bandwidth units are detected as being idle, the terminal equipment may transmit the uplink transmission when N>M, M$\geqslant$2 and the bandwidth units are inconsecutive. At this moment, N and M may be equal, that is N=M, or, N and M may satisfy the following relation: N>M, M$\geqslant$1, and the bandwidth units are inconsecutive when M$\geqslant$2, in which cases the terminal equipment may also transmit the uplink transmission.

In this example, the network device may also give different instructions for different signals/channels. For example, if a priority of a signal/channel, such as a PRACH, is relatively high, the network device may indicate via the second indication information to transmit the uplink transmission in a case where some of the units are idle, and details shall be described later.

In this implementation, that the terminal equipment judges whether to transmit the uplink transmission according to whether bandwidth units detected as being idle in the two or more bandwidth units satisfy a condition is taken as an example.

For example, the terminal equipment may transmit the uplink transmission when the bandwidth units detected as being idle include a specific bandwidth unit (referred to as a first bandwidth unit), that is, the terminal equipment judges whether the bandwidth units detected as being idle include the above first bandwidth unit, and if it is judged yes, it transmits the uplink transmission. Still taking the above as an example, if the channel detection result is that a part of the bandwidth units is idle and N>M, M≥1, the uplink transmission is transmitted only when the idle M bandwidth units include X (X≥1) first bandwidth units.

In this example, the above first bandwidth unit may be independently selected by the terminal equipment before performing the above channel detection, or may be directly or indirectly indicated by the network device via the above second indication information.

For example, the terminal equipment may independently select the first bandwidth unit. Thus, when the bandwidth units detected as being idle include the randomly selected first bandwidth unit, the terminal equipment transmits the uplink transmission.

For another example, the above second indication information may directly indicate the first bandwidth unit, or the above second indication information may indicate how the network device selects the first bandwidth unit, which is equivalent to indirectly indicating the first bandwidth unit. For example, the first bandwidth unit is a bandwidth unit to which an initial uplink or downlink BWP corresponds, and the network device may indirectly indicate the first bandwidth unit by indicating the initial uplink or downlink BWP via the above second indication information. For another example, the first bandwidth unit is a very first bandwidth unit to which the at least one resource corresponds, the network device may indirectly indicate the first bandwidth unit by indicating a position of the at least one resource via the second indication information. The above very first bandwidth unit is, for example, a first one of bandwidth units arranged in an ascending order in the frequency domain, and a case where the above at least one resource corresponds to only one bandwidth unit is included.

In this example, the above first bandwidth unit may be a bandwidth unit corresponding to the channel detection based on random back-off in the two or more bandwidth units of the carrier. Moreover, only one of the two or more bandwidth units of the carrier may correspond to the channel detection based on random back-off. That is, if the two or more bandwidth units of the carrier include only one bandwidth unit corresponding to the channel detection based on random back-off, the first bandwidth unit may be equivalent to the bandwidth unit corresponding to the channel detection based on random back-off, and the terminal equipment may independently select the bandwidth unit corresponding to the channel detection based on random back-off, and transmit the uplink transmission when the idle bandwidth units include the bandwidth unit corresponding to the channel detection based on random back-off, or the network device may directly or indirectly indicate the bandwidth unit corresponding to the channel detection based on random back-off via the above second indication information, and the terminal equipment transmits the uplink transmission when the idle bandwidth units include the bandwidth unit corresponding to the channel detection based on random back-off.

In this example, the above indirect indication indicates, for example, a bandwidth unit corresponding to a fixed time length in the two or more bandwidth units, and the terminal equipment selects a bandwidth unit based on random back-off in other bandwidth units. The fixed time length refers to being not based on random back-off, and corresponding lengths may be different in different situations.

In this implementation, that the terminal equipment judges whether to transmit the uplink transmission according to the signal and/or channel included in the above uplink transmission is taken as an example.

For example, there may exist a correspondence relationship between the above signal and/or channel and a situation under which the uplink transmission is transmitted. For example, a first type of signal may be transmitted when a part of the bandwidth units is idle, and the terminal equipment may determine whether to transmit the uplink transmission according to the signal and/or channel included in the uplink transmission. For example, a PRACH may be transmitted when a part of the bandwidth units is idle, and when the uplink transmission is a PRACH, once an idle bandwidth units are detected, the terminal equipment transmits the uplink transmission. What described above are examples only, and this embodiment is not limited thereto.

How the terminal equipment judges whether to transmit the uplink transmission according to at least one of the above items in step 202 is described by way of examples. The above examples may be combined arbitrarily, which shall not be described herein any further.

In another implementation of step 202, the terminal equipment may select the above at least one bandwidth unit from the bandwidth units detected as being idle according to the at least one of the above items, and transmit the uplink transmission on the selected at least one bandwidth unit.

In this implementation, the terminal equipment may also receive indication information (referred to as a third indication information) transmitted by the network device, the third indication information being related to how the terminal equipment selects the above at least one bandwidth unit from the bandwidth units detected as being idle, that is, the terminal equipment may select the above at least one bandwidth unit from the bandwidth units detected as being idle with reference to the third indication information and according to the at least one of the above items.

In this implementation, the terminal equipment may independently select the above at least one bandwidth unit from the bandwidth units detected as being idle according to the at least one of the above items, and/or the terminal equipment may select the above at least one bandwidth unit from the bandwidth units detected as being idle according to at least one of the above items and/or the indication of the network device (such as the above third indication information).

For example, the third indication information indicates "random selection", and the terminal equipment may randomly select the above at least one bandwidth unit in the bandwidth units detected as being idle according to the third indication information.

For another example, the third indication information indicates "performing selection based on a specific bandwidth unit", and the terminal equipment may select the at least one bandwidth unit including the specific bandwidth unit (referred to as a second bandwidth unit) in the bandwidth units detected as being idle according to the third indication information.

For a further example, the third indication information indicates "performing selection based on grouping and/or ordering", and the terminal equipment may group and/or order the bandwidth units detected as being idle or the two or more bandwidth units of the carrier on which the channel detection is performed, and select the at least one bandwidth unit according to the group and/or the order. Or, the third indication information indicates group and/or order of the two or more bandwidth units of the carrier, and the terminal equipment may select the at least one bandwidth unit according to the group and/or the order.

In this implementation, a definition of the above second bandwidth unit is similar to that of the first bandwidth unit, and the second bandwidth unit may be identical to or different from the first bandwidth unit. In this implementation, the second bandwidth unit may be independently selected by the terminal equipment, or may be indicated by the network device, such as being indicated via the third indication information with an indication manner similar to indicating the first bandwidth unit via the second indication information. For example, the third indication information may directly indicate the second bandwidth unit, or the third indication information may indicate how the terminal equipment selects the second bandwidth unit, which is equivalent to indirectly indicating the second bandwidth unit. For example, the second bandwidth unit is a bandwidth unit to an initial uplink or downlink BWP corresponds, and the network device may indirectly indicate the second bandwidth unit by indicating the initial uplink or downlink BWP via the above third indication information. For another example, the second bandwidth unit is a very first bandwidth unit to which the at least one resource corresponds, and the network device may indirectly indicate the second bandwidth unit by indicating a position of the at least one resource via the third indication information. The above very first bandwidth unit is, for example, a first one of bandwidth units arranged in an ascending order in the frequency domain, and a case where the above at least one resource corresponds to only one bandwidth unit is included.

In this example, the second bandwidth unit may be a bandwidth unit corresponding to channel detection based on random back-off in the two or more bandwidth units of the carrier. Moreover, only one of the two or more bandwidth units of the carrier may correspond to channel detection based on random back-off. That is, if the two or more bandwidth units of the carrier include only one bandwidth unit corresponding to channel detection based on random back-off, the second bandwidth unit may be equivalent to the bandwidth unit corresponding to channel detection based on random back-off, and the terminal equipment may independently select the bandwidth unit corresponding to channel detection based on random back-off, and transmit the uplink transmission when the idle bandwidth units include the bandwidth unit corresponding to channel detection based on random back-off, or the network device may directly or indirectly indicate the bandwidth unit corresponding to channel detection based on random back-off via the above third indication information, and the terminal equipment transmits the uplink transmission when the idle bandwidth units include the bandwidth unit corresponding to channel detection based on random back-off.

In this example, the above indirect indication indicates, for example, a bandwidth unit with a fixed time length in the two or more bandwidth units, and the terminal equipment selects a bandwidth unit based on random back-off in other bandwidth units. The fixed time length refers to being not based on random back-off, and corresponding lengths may be different in different situations.

In this implementation, when the second bandwidth unit is identical to the above first bandwidth unit, the third indication information and the above second indication information may be the same.

In this implementation, the above at least one bandwidth unit is the M bandwidth units in the above examples, which may include only one bandwidth unit, that is, M=1; or, it may also include two or more bandwidth units which are consecutive or inconsecutive in the frequency domain, that is, M≥2 and the bandwidth units are consecutive or inconsecutive.

Figure 5A:
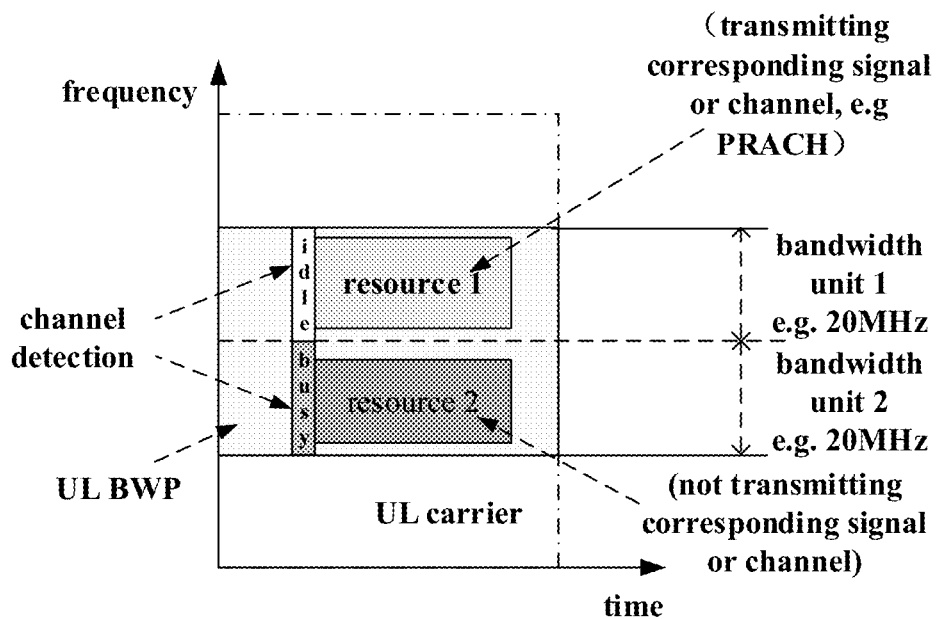
FIGS. 5A-5D are schematic diagrams of selecting bandwidth units.
Figure 5B:
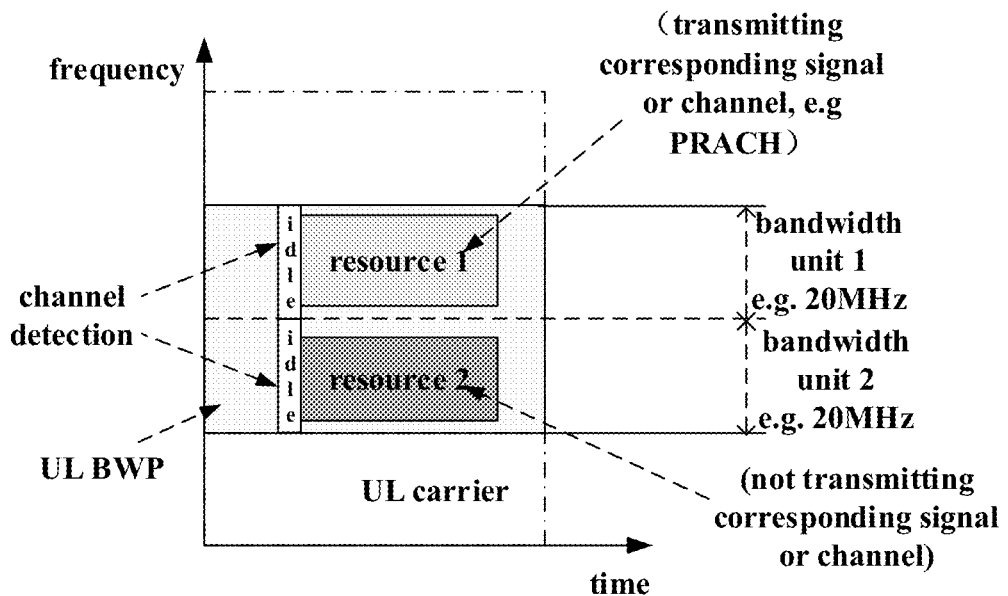
Figure 5C:
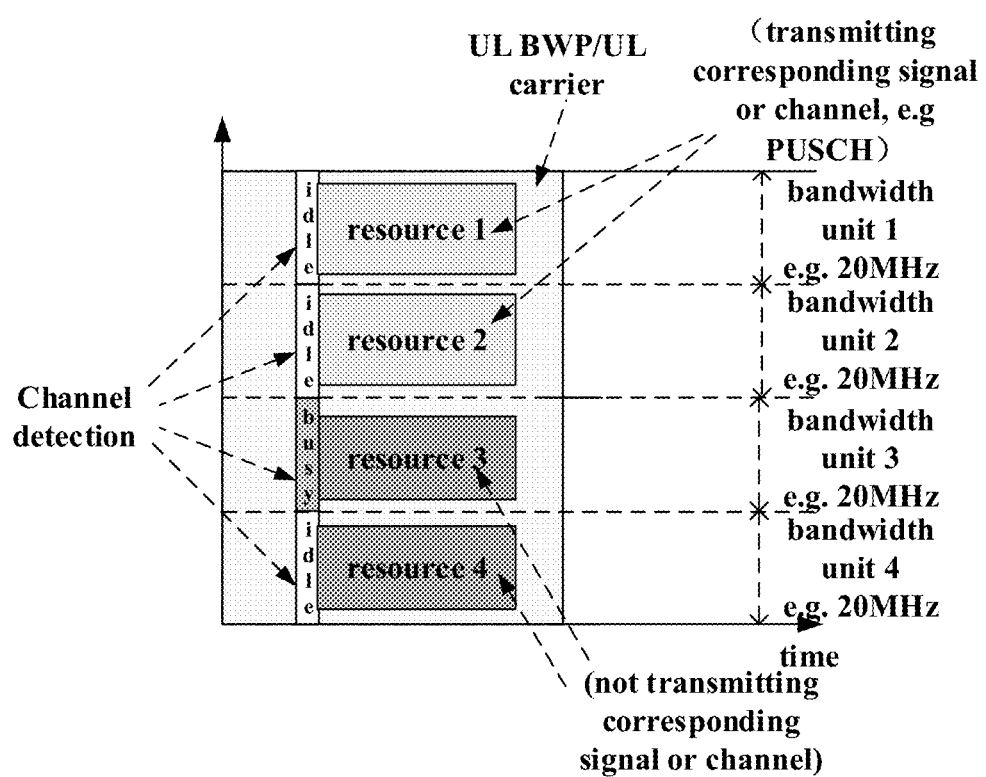
Figure 5D:
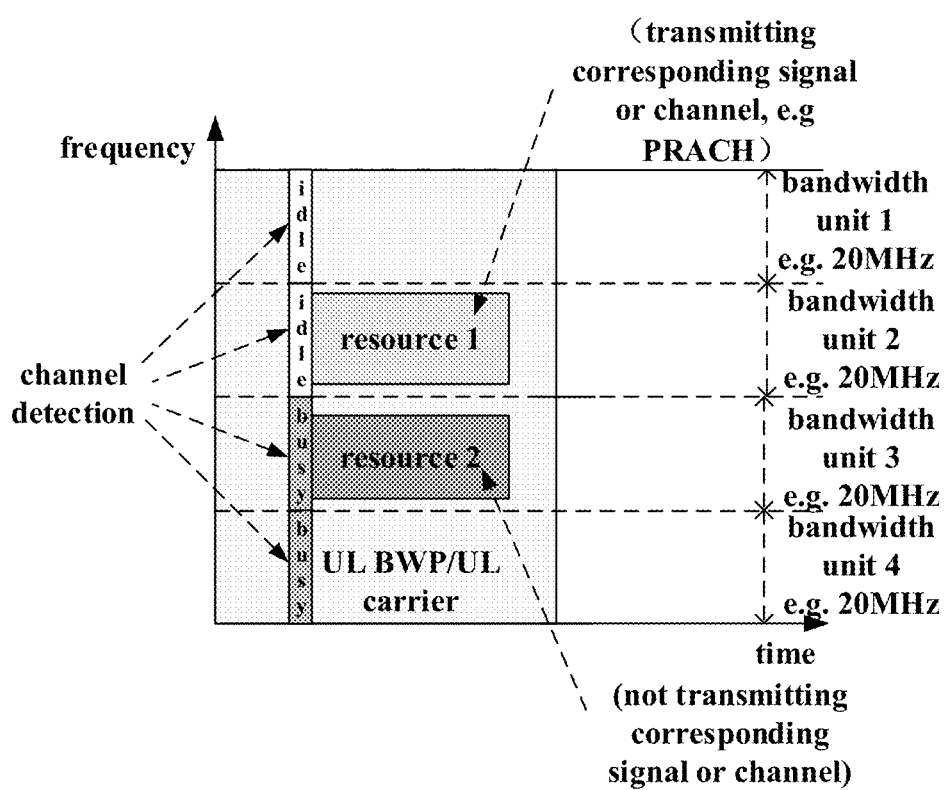

FIGS. 5A-5D are schematic diagrams of selecting bandwidth units. As shown in FIG. 5A, in this example, the terminal equipment performs channel detection on two bandwidth units to which an uplink carrier corresponds. These two bandwidth units are on a UL BWP, detection results of these two bandwidth units are that bandwidth unit 1 is idle, and bandwidth unit 2 is busy, and the terminal equipment may select to perform uplink transmission (PRACH) on bandwidth unit 1. As shown in FIG. 5B, in this example, what is different from the example in FIG. 5A is that detection results are that both the two bandwidth units are idle, and the terminal equipment may select one of them, such as bandwidth unit 1, for performing uplink transmission (PRACH). As shown in FIG. 5C, in this example, the terminal equipment performs uplink transmission on four bandwidth units to which an uplink carrier corresponds. These four bandwidth units are on a UL BWP, and detection results are that bandwidth units 1-2 and 4 are idle, and bandwidth unit 3 is busy, and the terminal equipment may select bandwidth unit 1 and bandwidth unit 2 to transmit the uplink transmission (PUSCH). As shown in FIG. 5D, in this example, what is different from the example in FIG. 5C is that only bandwidth unit 2 and bandwidth unit 3 respectively correspond to a resource. Although bandwidth unit 1 and bandwidth unit 2 are idle, the terminal equipment selects bandwidth unit 2 for performing uplink transmission (PRACH).

It should be pointed out that in FIG. 5D, the terminal equipment performs channel detection on all bandwidth units 1-4 of the UL BWP or UL carrier. However, this disclosure is not limited thereto, and the terminal equipment may also perform channel detection only on a bandwidth unit to which a resource corresponds, such as performing channel detection only on bandwidth units 2-3 to which resources 1-2 correspond.

In still another implementation of step 202, the terminal equipment may also switch a transmission bandwidth or not switch a transmission bandwidth before transmitting the uplink transmission according to the at least one item. For example, the terminal equipment may judge whether to switch the transmission bandwidth according to the above at least one item and/or the indication of the network device and/or the capability of the terminal equipment. If it is judged yes, the terminal equipment may switch the transmission bandwidth before transmitting the uplink transmission.

In this implementation, the terminal equipment may receive indication information (referred to as fourth instruction information) transmitted by the network device, the fourth indication information being related to whether the terminal equipment switches a transmission bandwidth before transmitting uplink transmission, that is, the terminal equipment may switch a transmission bandwidth or not switch a transmission bandwidth before transmitting uplink transmission with reference to the fourth indication information and according to the at least one of the above items and/or the capability of the terminal equipment.

In this implementation, assuming that there are K bandwidth units for transmitting uplink transmission, K≥1. If the terminal equipment is allowed to transmit the uplink transmission on a part of bandwidth units K'(K'<K), the network device may indicate via the fourth indication information whether the terminal equipment needs to switch a transmitting bandwidth before transmitting the uplink transmission.

For example, according to a degree of channel congestion, the network device may indicate whether the terminal equipment needs to switch the transmission bandwidth before transmitting the uplink transmission via the above fourth indication information. When the channel is congested, the terminal equipment may be indicated to switch the transmitting bandwidth before transmitting the uplink transmission so as to reduce impact of the uplink transmission of the terminal equipment on other devices; otherwise, the terminal equipment may be indicated not to switch the transmitting bandwidth before transmitting the uplink transmission.

For another example, the terminal equipment may judge according to a signal and/or channel included in the uplink transmission whether to switch the transmission bandwidth. For example, if the signal and/or channel included in the uplink transmission is a PRACH, the transmission bandwidth is not switched; otherwise, the transmission bandwidth is switched so as to reduce impact on other devices.

In this example, description is given by taking a PRACH as an example. However, this embodiment is not limited thereto, and in a particular implementation process, there exists a correspondence relationship between whether to switch a transmission bandwidth and a signal and/or channel included in uplink transmission, for example, a first type of signals and/or channels correspond to switching a transmission bandwidth, and a second type of signals and/or channels correspond to not switching a transmission bandwidth. Therefore, the terminal equipment may determine whether to switch a transmission bandwidth according to the signal and/or channel included in the uplink transmission.

How the terminal equipment transmits the uplink transmission according to the at least one item is described above by taking the three implementations as examples. In a particular implementation process, the above three implementations may be combined arbitrarily. For example, the terminal equipment may only determine whether to transmit uplink transmission but does not select the above at least one bandwidth unit and does not switch the transmission bandwidth, or the terminal equipment may determine whether to transmit uplink transmission and select the above at least one bandwidth unit but does not switch the transmission bandwidth, etc., which shall not be described herein any further.

In this embodiment, the above indication information (the first to fourth indication information) may be at least one piece of the following information or signaling: physical layer signaling, medium access control (MAC) layer signaling, and radio resource control (RRC) signaling.

In this embodiment, considering a hardware cost of the terminal equipment, a cell or system may include not only a terminal equipment supporting the capability but also a terminal equipment not supporting the capability. In such a case, in order to achieve better coexistence (coordination of resources) between terminal equipments or between different systems, the terminal equipment may inform (report) information on the capability to the network device. And the network device may schedule the terminal equipment according to the information, such as allocating/indicating resources, indicating a channel detection mode, and indicating how the terminal equipment transmits data according to a channel detection result.

In one implementation, the terminal equipment may transmit indication information (referred to as fifth indication information) to the network device, the fifth indication information directly or indirectly indicating a capability of the terminal equipment, the capability directly or indirectly characterizing whether the terminal equipment supports switching the transmission bandwidth within a time range after the channel detection, and/or whether the terminal equipment supports simultaneous transmitting the uplink transmission on inconsecutive bandwidth units in the two or more bandwidth units of the carrier.

In this implementation, if the network device has learned that the terminal equipment does not possess the above capability, or in other words, the terminal equipment does not support, the network device does not allow it to transmit uplink transmission when a part of the bandwidth units is idle, so as not to affect data transmission and reception of other devices. What described above are examples only, and optionally, the network device may also indicate signals and/or channels on which uplink transmission may be transmitted when a part of the bandwidth units is idle, or may indicate signals and/or channels on which uplink transmission may be transmitted when all bandwidth units are idle.

FIG. 6 is an overall flowchart of the method of this embodiment. In this flowchart, the possible behaviors of the terminal equipment are described, however, as described above, according to the channel detection result or according to the indication of the network device or according to the capability of its own or according to a predefined rule, some steps are optional, and some steps may be added or some steps may be omitted.

As shown in FIG. 6, the method includes:

step 601: the capability is reported;

step 602: resources is acquired from the network device according to an indication of the network device;

step 603: channel detection is performed according to the predefined rule and/or the indication of the network device; executing step 604 if the channel detection result is that the channels are not idle; executing step 605 if the channel detection result is that some channels are idle but are not consecutive; executing step 606 if the channel detection result is that some channels are idle and are consecutive; and executing step 607 or 609 if the channel detection result is that all the channels are idle;

step 604: that the uplink transmission fails is acknowledged, and turning back to step 602 to re-acquire resources or turning back step 603 to perform channel detection again on a next resource;

step 605: whether to transmit uplink transmission is judged according to the predefined rule and/or the indication of the network device; turning back to step 604 if it is judged no, and executing step 607 if it is judged yes;

step 606: whether to transmit uplink transmission is judged according to the predefined rule and/or the indication of the network device; turning back to step 604 if it is judged no, and executing step 607 if it is judged yes;

step 607: a bandwidth unit is selected or determined according to the predefined rule and/or the indication of the network device;

step 608: the transmitting bandwidth is switched according to the predefined rule and/or the indication of the network device; and step 609: the uplink transmission is transmitted.

According to the method of this embodiment, the terminal equipment may perform channel detection on two or more bandwidth units of a carrier, and determine whether the bandwidth units are busy or idle, thereby starting or completing data transmission more fast.

Embodiment 2

The embodiment of this disclosure provides an uplink scheduling method, applicable to a network device, such as the gNB, etc., as described above. This method is processing at a network device side corresponding to the method of Embodiment 1, and contents in this embodiment identical to those in Embodiment 1 shall not be described herein any further.

FIG. 7 is a schematic diagram of the uplink scheduling method of this embodiment. As shown in FIG. 7, the method includes:

step 701: a network device transmits at least one piece of first indication information to a terminal equipment, the at least one piece of first indication information indicating at least one resource capable of being used for uplink transmission, the at least one resource corresponding to at least one bandwidth unit in two or more bandwidth units of a carrier in the frequency domain.

In this embodiment, the terminal equipment may perform channel detection on the two or more bandwidth units after receiving the first indication information, and transmits uplink transmission on at least one bandwidth unit detected as being idle according to a result of the channel detection. As described in Embodiment 1, the above two or more bandwidth units are on a BWP, and the BWP may be an active BWP.

In this embodiment, one of the above at least one resource refers to a time-frequency resource used for a complete uplink transmission.

In one implementation, at least one bandwidth unit to which the at least one resource corresponds in the frequency domain is two or more bandwidth units, the at least one resource is two or more resources, and time-domain starting positions of the at least one resource are identical.

In another implementation, at least one bandwidth unit to which the at least one resource corresponds in the frequency domain is two or more bandwidth units, the at least one resource is one resource, and time-domain starting positions of parts of the resource corresponding to different bandwidth units are identical.

In this implementation, the above at least one resource is used for transmitting identical signals and/or channels, and the at least one piece of first indication information used for indicating the at least one resource is one piece of first indication information. Contents of the first indication information have been described in Embodiment 1, which are incorporated herein, and shall not be described herein any further.

In this implementation, the network device may also transmit second indication information to the terminal equipment, the second indication information being related to how the terminal equipment judges whether to transmit uplink transmission. Contents of the second indication information and behaviors of the terminal equipment have been described in Embodiment 1, which are incorporated herein, and shall not be described herein any further.

In this implementation, the network device may also transmit third indication information to the terminal equipment, the third indication information being related to how the terminal equipment selects the at least one bandwidth unit from the bandwidth units detected as being idle. Contents of the third indication information and behaviors of the terminal equipment have been described in Embodiment 1, which are incorporated herein, and shall not be described herein any further.

In this embodiment, the network device may also transmit fourth indication information to the terminal equipment, the fourth indication information being related to whether the terminal equipment switches a transmission bandwidth before transmitting the uplink transmission. Contents of the fourth indication information and behaviors of the terminal equipment have been described in Embodiment 1, which are incorporated herein, and shall not be described herein any further.

In this implementation, the network device may also receive fifth indication information transmitted by the terminal equipment, the fifth indication information indicating a capability of the terminal equipment, the capability directly or indirectly characterizing whether the terminal equipment supports switching the transmission bandwidth within a time range after the channel detection, and/or whether the terminal equipment supports simultaneous transmitting the uplink transmission on inconsecutive bandwidth units in the two or more bandwidth units of the carrier. Contents of the fifth indication information and behaviors of the terminal equipment have been described in Embodiment 1, which are incorporated herein, and shall not be described herein any further.

In this implementation, the network device may also exchange information with other network devices so as to coordinate resources. The information may be related to a channel detection and/or data reception and transmission method adopted by the network device and/or a terminal equipment served by the network device. For example, the information is used to indicate a main bandwidth unit used by the network device and/or the terminal equipment served by the network device for channel detection and/or data transmission, and/or is used to indicate whether the network device and/or the terminal equipment served by the network device support(s) switching the transmission bandwidth within a certain time range after the channel detection. A manner of information exchange and a manner of resource coordination are not limited in this embodiment.

FIG. 8 is another schematic diagram of the uplink scheduling method of this embodiment. As shown in FIG. 8, the method includes:

step 801: a network device transmits second indication information to a terminal equipment, the second indication information being related to how the terminal equipment judges whether to transmit the uplink transmission, and the terminal equipment judges whether to transmit the uplink transmission according the second indication information.

In this embodiment, contents of the second indication information and behaviors of the terminal equipment have been described in Embodiment 1, which are incorporated herein, and shall not be described herein any further.

According to this embodiment, the terminal equipment may judge whether to transmit uplink transmission according to the indication of the network device. A particular judgment method has been described in Embodiment 1, and shall not be described herein any further.

FIG. 9 is a further schematic diagram of the uplink scheduling method of this embodiment. As shown in FIG. 9, the method includes:

step 901: a network device transmits third indication information to a terminal equipment, the third indication information being related to how the terminal equipment selects the at least one bandwidth unit from the bandwidth units detected as being idle, and the terminal equipment selects at least one bandwidth unit from the bandwidth units detected as being idle according to the third indication information, and transmits uplink transmission on the selected at least one bandwidth unit.

In this implementation, contents of the third indication information and behaviors of the terminal equipment have been described in Embodiment 1, which are incorporated herein, and shall not be described herein any further.

According to this embodiment, the terminal equipment may select the at least one bandwidth unit from the bandwidth units detected as being idle according to the indication of the network device. A particular selection method has been described in Embodiment 1, and shall not be described herein any further.

FIG. 10 is still another schematic diagram of the uplink scheduling method of this embodiment. As shown in FIG. 10, the method includes:

step 1001: a network device transmits fourth indication information to a terminal equipment, the fourth indication information being related to whether the terminal equipment switches a transmission bandwidth before transmitting the uplink transmission, and the terminal equipment switches the transmission bandwidth or does not switch the transmission bandwidth before transmitting the uplink transmission according to the fourth indication information.

In this embodiment, contents of the fourth indication information and behaviors of the terminal equipment have been described in Embodiment 1, which are incorporated herein, and shall not be described herein any further.

According to this implementation, the terminal equipment may judge whether to switch the transmission bandwidth before transmitting the uplink transmission according to the indication of the network device. A particular judgment method has been described in Embodiment 1, and shall not be described herein any further.

FIG. 11 is yet another schematic diagram of the uplink scheduling method of this embodiment. As shown in FIG. 11, the method includes:

step 1101: a network device exchanges information with other network devices to coordinate resources, the information being related to channel detection and/or data reception and transmission method adopted by the network device and/or the terminal equipment served by the network device.

In this implementation, the information is used to indicate a main bandwidth unit used by the network device and/or the terminal equipment served by the network device for channel detection and/or data transmission, and/or is used to indicate whether the network device and/or the terminal equipment served by the network device support(s) switching the transmission bandwidth within a certain time range after the channel detection. A manner of information exchange and a manner of resource coordination are not limited in this embodiment.

FIG. 12 is an overall flowchart of the method of this embodiment. In this flowchart, possible behaviors of the network device are described. However, as described above, some steps are optional. And, on this basis, some steps may be added, or some steps may be omitted.

As shown in FIG. 12, the method includes:

step 1201: a resource is indicated;
step 1202: a channel detection mode is indicated;
step 1203: how to transmit the uplink transmission is indicated according to the channel detection result.

In steps 1201-1203, the network device may perform corresponding processing according to the capability reported by the terminal equipment and/or the result of information exchange with other network devices.

According to the method of this embodiment, the terminal equipment may perform channel detection on two or more bandwidth units of a carrier, and determine whether the bandwidth units are busy or idle, thereby starting or completing data transmission more fast.

Embodiment 3

The embodiment of this disclosure provides an uplink transmission apparatus, configured in a terminal equipment. As principles of the apparatus for solving problems are similar to that of the method of Embodiment 1, reference may be made to the implementation of the method of Embodiment 1 for implementation of this apparatus, with identical parts being not going to be described herein any further.

Figure 13:
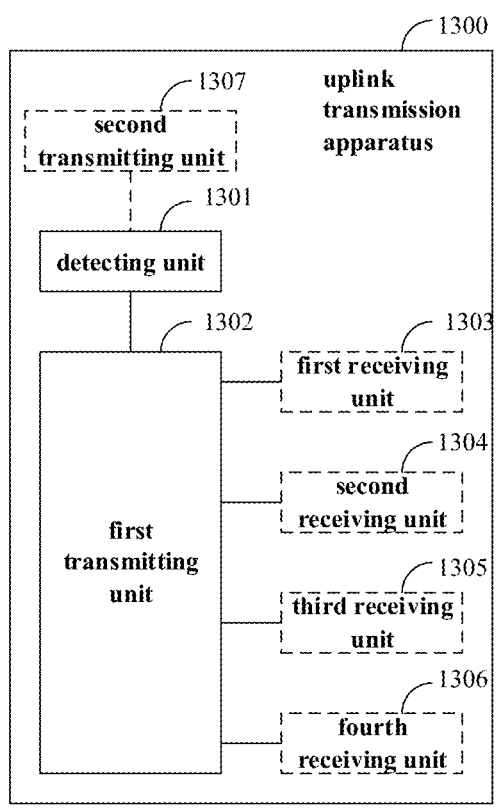
FIG. 13 is a schematic diagram of the uplink transmission apparatus of Embodiment 3.

FIG. 13 is a schematic diagram of the uplink transmission apparatus of this embodiment. Referring to FIG. 13, the uplink transmission apparatus 1300 includes a detecting unit 1301 and a first transmitting unit 1302. The detecting unit 1301 is configured to perform channel detection on two or more bandwidth units of a carrier, and the first transmitting unit 1302 is configured to transmit uplink transmission on at least one bandwidth unit according to a result of the channel detection, the at least one bandwidth unit being detected as being idle.

In this embodiment, as shown in FIG. 13, the apparatus 1300 may further include:

a first receiving unit 1303 configured to receive at least one piece of first indication information transmitted by the network device, the at least one piece of first indication information indicating at least one resource capable of being used for uplink transmission.

In this embodiment, one of the above at least one resource refers to a time-frequency resource used for a complete uplink transmission.

In this embodiment, the at least one resource corresponds to at least one bandwidth unit in the two or more bandwidth units of the carrier in the frequency domain.

For example, the at least one bandwidth unit to which the at least one resource corresponds in the frequency domain is two or more bandwidth units, the at least one resource is two or more resources, and time-domain starting positions of the at least one resource are identical.

For another example, the at least one bandwidth unit to which the at least one resource corresponds in the frequency domain is two or more bandwidth units, the at least one resource is one resource, and time-domain starting positions of parts of the resource corresponding to different bandwidth units are identical.

In this embodiment, the above at least one resource is used to transmit identical signals and/or channels, and the above at least one piece of first indication information used for indicating the at least one resource is one piece of first indication information.

In this embodiment, the first transmitting unit 1302 may transmit the uplink transmission according to at least one item of the following: the number of bandwidth units detected as being idle in the two or more bandwidth units; positions of bandwidth units detected as being idle in the two or more bandwidth units; whether bandwidth units detected as being idle in the two or more bandwidth units satisfy a condition; and signals and/or channels included in the uplink transmission.

In one implementation, the first transmitting unit 1302 may judge whether to transmit the uplink transmission according to the above at least one item; and if it is judged yes, the first transmitting unit 1302 transmits the uplink transmission.

In this implementation, as shown in FIG. 13, the apparatus 1300 may further include:
- a second receiving unit 1304 configured to receive second indication information transmitted by the network device, the second indication information being related to how the first transmitting unit 1302 judges whether to transmit the uplink transmission according the above at least one item.

In this embodiment, whether the bandwidth unit detected as being idle satisfies a condition may be: whether the bandwidth unit detected as being idle includes a first bandwidth unit. That is, the first transmitting unit 1302 judges whether the bandwidth unit detected as being idle includes the first bandwidth unit, and if it is judged yes, the uplink transmission is transmitted.

In this implementation, the first bandwidth unit may be a bandwidth unit in the above two or more bandwidth units corresponding to channel detection based on random back-off. And only one of the two or more bandwidth units may correspond to channel detection based on random back-off.

In this implementation, the first bandwidth unit may be selected by the terminal equipment before performing channel detection, and/or may be indicated by the network device, such as being indicated via the above second indication information.

In another implementation, the first transmitting unit 1302 may select the above at least one bandwidth unit from the bandwidth units detected as being idle according to the above at least one item, and transmit the uplink transmission on the selected at least one bandwidth unit.

In this implementation, as shown in FIG. 13, the apparatus 1300 may further include:
- a third receiving unit 1305 configured to receive third indication information transmitted by the network device, the third indication information being related to how the first transmitting unit 1302 selects the at least one bandwidth unit from the bandwidth units detected as being idle.

In this implementation, the first transmitting unit 1302 may independently select the above at least one bandwidth unit from the bandwidth units detected as being idle according to the above at least one item, and/or, the first transmitting unit 1302 may also select the above at least one bandwidth unit from the bandwidth units detected as being idle according to the at least one item and/or the indication of the network device.

For example, the first transmitting unit 1302 may randomly select the at least one bandwidth unit in the bandwidth units detected as being idle according to the above third indication information; or, the first transmitting unit 1302 may select the at least one bandwidth unit including a second bandwidth unit from the bandwidth units detected as being idle according to the above third indication information; or, the first transmitting unit 1302 may perform grouping and/or ordering on the bandwidth units detected as being idle or the above two or more bandwidth units on which the channel detection is performed according to the above third indication information, and select the at least one bandwidth unit according to the group and/or order.

In this implementation, the at least one bandwidth unit includes one bandwidth unit, or the at least one bandwidth unit includes two or more bandwidth units which are consecutive or inconsecutive in the frequency domain.

In a further implementation, the first transmitting unit 1302 may switch the transmitting bandwidth or not switch the transmitting bandwidth before transmitting the uplink transmission according to the above at least one item.

For example, the first transmitting unit 1302 may judge whether to switch the transmitting bandwidth before transmitting the uplink transmission according to the above at least one item and/or the indication of the network device and/or the capability of the terminal equipment; and if it is judged yes, the first transmitting unit 1302 switches the transmission bandwidth before transmitting the uplink transmission.

In this implementation, as shown in FIG. 13, the apparatus 1300 may further include:
- a fourth receiving unit 1306 configured to receive fourth indication information transmitted by the network device, the fourth indication information being related to whether the terminal equipment switches a transmission bandwidth before transmitting the uplink transmission.

In this embodiment, as shown in FIG. 13, the apparatus 1300 may further include:
- a second transmitting unit 1307 configured to transmit fifth indication information to the network device, the fifth indication information directly or indirectly indicating a capability of the terminal equipment, the capability directly or indirectly characterizing whether the terminal equipment supports switching the transmission bandwidth within a time range after the channel detection, and/or whether the terminal equipment supports simultaneous transmitting the uplink transmission on inconsecutive bandwidth units in the two or more bandwidth units of the carrier.

According to the apparatus of this embodiment, the terminal equipment may perform channel detection on two or more bandwidth units of a carrier, and determine whether the bandwidth units are busy or idle, thereby starting or completing data transmission more fast.

Embodiment 4

The embodiment of this disclosure provides an uplink scheduling apparatus, configured in a network device. As principles of the apparatus for solving problems are similar to that of the method of Embodiment 2, reference may be made to the implementation of the method of Embodiment 2 for implementation of this apparatus, with identical parts being not going to be described herein any further.

Figure 14:
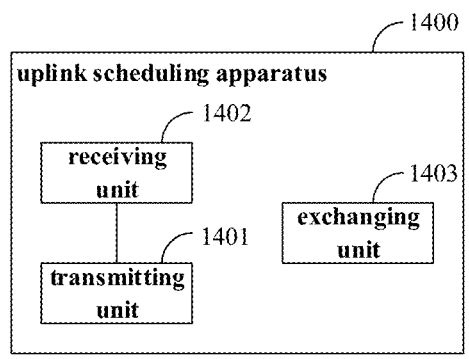
FIG. 14 is a schematic diagram of the uplink scheduling apparatus of Embodiment 4.

FIG. 14 is a schematic diagram of the uplink scheduling apparatus of this embodiment. As shown in FIG. 14, the uplink scheduling apparatus 1400 includes:
- a transmitting unit 1401 configured to transmit at least one piece of first indication information to a terminal equipment, the at least one piece of first indication information indicating at least one resource capable of being used for uplink transmission, the at least one resource corresponding to at least one bandwidth unit in two or more bandwidth units of a carrier in the frequency domain, the terminal equipment performing channel detection on the two or more bandwidth units, and transmitting uplink transmission on at least one bandwidth unit being detected as being idle according to a result of the channel detection.

In this embodiment, one of the above at least one resource refers to a time-frequency resource used for a complete uplink transmission.

In one implementation, the at least one bandwidth unit to which the at least one resource corresponds in the frequency domain is two or more bandwidth units, the at least one resource is two or more resources, and time-domain starting positions of the at least one resource are identical.

In another implementation, the at least one bandwidth unit to which the at least one resource corresponds in the frequency domain is two or more bandwidth units, the at least one resource is one resource, and time-domain starting positions of parts of the resource corresponding to different bandwidth units are identical.

In this implementation, the above at least one resource is used for transmitting identical signals and/or channels, and the at least one piece of first indication information used for indicating the at least one resource is one piece of first indication information.

In this embodiment, the transmitting unit 1401 may also transmit second indication information to the terminal equipment, the second indication information being related to how the terminal equipment judges whether to transmit uplink transmission. And the terminal equipment may judge whether to transmit the uplink transmission according to the second indication information.

In this implementation, the transmitting unit 1401 may also transmit third indication information to the terminal equipment, the third indication information being related to how the terminal equipment selects the at least one bandwidth unit from the bandwidth units detected as being idle. And the terminal equipment may select at least one bandwidth unit from the bandwidth units detected as being idle according to the third indication information, and transmits the uplink transmission on the selected at least one bandwidth unit.

In this embodiment, the transmitting unit 1401 may also transmit fourth indication information to the terminal equipment, the fourth indication information being related to whether the terminal equipment switches a transmission bandwidth before transmitting the uplink transmission. And the terminal equipment may switch the transmission bandwidth or not switch the transmission bandwidth before transmitting the uplink transmission according to the fourth indication information.

In this embodiment, as shown in FIG. 14, the apparatus 1400 may further include:

a receiving unit 1402 configured to receive fifth indication information transmitted by the terminal equipment, the fifth indication information indicating a capability of the terminal equipment, the capability directly or indirectly characterizing whether the terminal equipment supports switching the transmission bandwidth within a time range after the channel detection, and/or whether the terminal equipment supports simultaneous transmitting the uplink transmission on inconsecutive bandwidth units in the two or more bandwidth units of the carrier.

In this embodiment, as shown in FIG. 14, the apparatus 1400 may further include:

an exchanging unit 1403 configured to exchange information with other network devices so as to coordinate resources. The information may be related to a channel detection and/or data reception and transmission method adopted by the network device and/or a terminal equipment served by the network device. For example, the information is used to indicate a main bandwidth unit used by the network device and/or the terminal equipment served by the network device for channel detection and/or data transmission, and/or is used to indicate whether the network device and/or the terminal equipment served by the network device support(s) switching the transmission bandwidth within a certain time range after the channel detection.

In this embodiment, the above second indication information, third indication information and fourth indication information may not depend on transmission of the first indication information and reception of the fifth indication information, that is, the uplink scheduling apparatus 1400 may only include the transmitting unit 1401 transmitting the second indication information, or only includes the transmitting unit 1401 transmitting the third indication information, or only includes the transmitting unit 1401 transmitting the fourth indication information, behaviors of which having been explained above, and being not going to be described herein any further.

In addition, in this embodiment, the exchanging unit 1403 may also not depend on transmission or reception of the above indication information, that is, the uplink scheduling apparatus 1400 may only include the above exchanging unit 1403, behaviors of which having been explained above, and being not going to be described herein any further.

According to the apparatus of this embodiment, the terminal equipment may perform channel detection on two or more bandwidth units of a carrier, and determine whether the bandwidth units are busy or idle, thereby starting or completing data transmission more fast.

Embodiment 5

The embodiment of this disclosure provides a terminal equipment, including the apparatus 1300 described in Embodiment 3.

Figure 15:
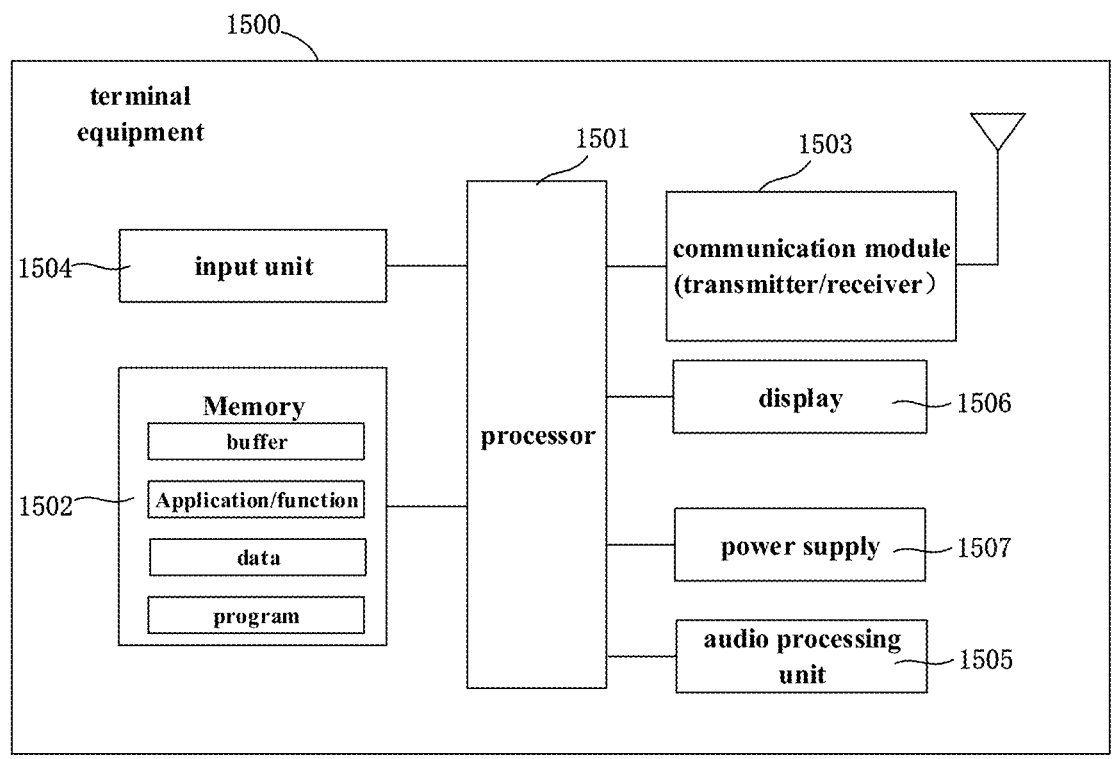
FIG. 15 is a schematic diagram of the terminal equipment of Embodiment 5.

FIG. 15 is a schematic diagram of the terminal equipment of the embodiment of this disclosure. As shown in FIG. 15, the terminal equipment 1500 may include a central processing unit 1501 and a memory 1502, the memory 1502 being coupled to the central processing unit 1501. It should be noted that this figure is illustrative only, and other types of structures may also be used, so as to supplement or replace this structure and achieve a telecommunications function or other functions.

In one implementation, the functions of the apparatus 1300 described in Embodiment 3 may be integrated into the central processing unit 1501, and the central processing unit 1501 executes functions of the apparatus 1300 described in Embodiment 3. The functions of the apparatus 1300 described in Embodiment 3 are incorporated herein, and shall not be described herein any further.

In another implementation, the apparatus 1300 described in Embodiment 3 and the central processing unit 1501 may be configured separately; for example, the apparatus 1300 described in Embodiment 3 may be configured as a chip connected to the central processing unit 1501, and the functions of the apparatus 1300 described in Embodiment 3 are executed under control of the central processing unit 1501.

As shown in FIG. 15, the terminal equipment 1500 may further include a communication module 1503, an input unit 1504, an audio processing unit 1505, a display 1506, and a power supply 1507, etc. It should be noted that the terminal equipment 1500 does not necessarily include all the parts shown in FIG. 15. Furthermore, the terminal equipment 1500 may include parts not shown in FIG. 15, and the related art may be referred to.

As shown in FIG. 15, the central processing unit 1501 is sometimes referred to as a controller or an operational control, which may include a microprocessor or other processor devices and/or logic devices. The central processing unit 1501 receives input and controls operations of components of the terminal equipment 1500.

The memory 1502 may be, for example, one or more of a buffer memory, a flash memory, a hard drive, a mobile medium, a volatile memory, a nonvolatile memory, or other suitable devices, which may store various data, etc., and furthermore, store programs executing related information. And the central processing unit 1501 may execute programs stored in the memory 1502, so as to realize information storage or processing, etc. Functions of other parts are similar to those of the related art, which shall not be described herein any further. The parts of the terminal equipment 1500 may be realized by specific hardware, firmware, software, or any combination thereof, without departing from the scope of this disclosure.

With the terminal equipment of this embodiment, the terminal equipment may perform channel detection on two or more bandwidth units of a carrier, and determine whether the bandwidth units are busy or idle, thereby starting or completing data transmission more fast.

Embodiment 6

The embodiment of this disclosure provides a network device, such as a gNB (a base station in NR), including the apparatus 1400 described in Embodiment 4.

Figure 16:
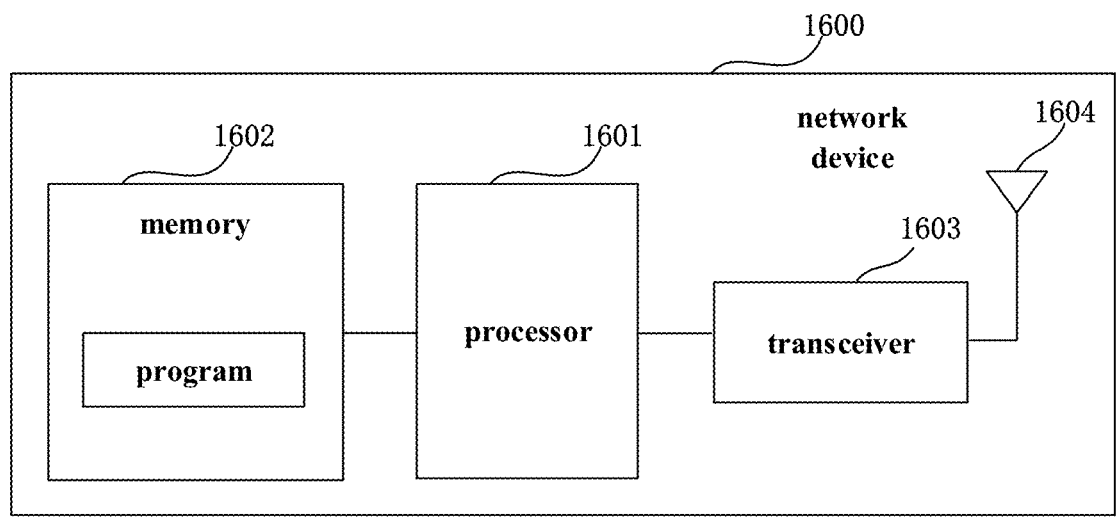
FIG. 16 is a schematic diagram of the network device of Embodiment 6.

FIG. 16 is a schematic diagram of the network device of the embodiment of this disclosure. As shown in FIG. 16, the network device 1600 may include a central processing unit (CPU) 1601 and a memory 1602, the memory 1602 being coupled to the central processing unit 1601. The memory 1602 may store various data, and furthermore, it may store a program for data processing, and execute the program under control of the central processing unit 1601, so as to receive various information transmitted by a terminal equipment, and transmit various information to the terminal equipment.

In one implementation, the functions of the apparatus 1400 described in Embodiment 4 may be integrated into the central processing unit 1601, and the central processing unit 1601 executes functions of the apparatus 1400 described in Embodiment 4. The functions of the apparatus 1400 described in Embodiment 4 are incorporated herein, and shall not be described herein any further.

In another implementation, the apparatus 1400 described in Embodiment 4 and the central processing unit 1601 may be configured separately; for example, the apparatus 1400 described in Embodiment 4 may be configured as a chip connected to the central processing unit 1601, and the functions of the apparatus 1400 described in Embodiment 4 are executed under control of the central processing unit 1601.

Furthermore, as shown in FIG. 16, the network device 1600 may include a transceiver 1603, and an antenna 1604, etc. Functions of the above components are similar to those in the related art, and shall not be described herein any further. It should be noted that the network device 1600 does not necessarily include all the parts shown in FIG. 16. Furthermore, the network device 1600 may include parts not shown in FIG. 16, and the related art may be referred to.

With the network device of this embodiment, the terminal equipment may perform channel detection on two or more bandwidth units of a carrier, and determine whether the bandwidth units are busy or idle, thereby starting or completing data transmission more fast.

Embodiment 7

The embodiment of this disclosure provides a communication system, including a network device and a terminal equipment. The network device is, for example, the network device 1600 described in Embodiment 6, and the terminal equipment is, for example, the terminal equipment 1500 described in Embodiment 5.

In this embodiment, the network device may be, for example, a gNB in NR, and may include the functions of the apparatus 1400 described in Embodiment 4 to carry out the method described in Embodiment 2. Furthermore, it includes conventional compositions and functions of a network device, which are as described in Embodiment 6, and shall not be described herein any further.

In this embodiment, the terminal equipment is, for example, a UE served by a gNB, and may include the functions of the apparatus 1300 described in Embodiment 3 to carry out the method described in Embodiment 1. Furthermore, it includes conventional compositions and functions of a terminal equipment, which are as described in Embodiment 5, and shall not be described herein any further.

With the communication system of this embodiment, the terminal equipment may perform channel detection on two or more bandwidth units of a carrier, and determine whether the bandwidth units are busy or idle, thereby starting or completing data transmission more fast.

An embodiment of this disclosure provides a computer readable program, which, when executed in a terminal equipment, will cause a computer to carry out the method described in Embodiment 1 in the terminal equipment.

An embodiment of this disclosure provides a storage medium storing a computer readable program, which will cause a computer to carry out the method described in Embodiment 1 in a terminal equipment.

An embodiment of this disclosure provides a computer readable program, which, when executed in a network device, will cause a computer to carry out the method described in Embodiment 2 in the network device.

An embodiment of this disclosure provides a storage medium storing a computer readable program, which will cause a computer to carry out the method described in Embodiment 2 in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The logic device is such as a field programmable logic component, a microprocessor, or a processor used in a computer, etc. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

According to the implementations disclosed in the embodiments, following supplements are further disclosed.

1. An uplink transmission apparatus, configured in a terminal equipment, the apparatus including:
    a detecting unit configured to perform channel detection on two or more bandwidth units of a carrier; and
    a first transmitting unit configured to transmit uplink transmission on at least one bandwidth unit according to a result of the channel detection, the at least one bandwidth unit being detected as being idle.

2. The apparatus according to supplement 1, wherein the apparatus further includes:
    a first receiving unit configured to receive at least one piece of first indication information transmitted by the network device, the at least one piece of first indication information indicating at least one resource capable of being used for uplink transmission.

3. The apparatus according to supplement 2, wherein the at least one resource corresponds to at least one bandwidth unit in the two or more bandwidth units of the carrier in the frequency domain.

4. The apparatus according to supplement 3, wherein,
    the at least one bandwidth unit to which the at least one resource corresponds in the frequency domain is two or more bandwidth units, the at least one resource is two or more resources, and time-domain starting positions of the at least one resource are identical;
    or,
    the at least one bandwidth unit to which the at least one resource corresponds in the frequency domain is two or more bandwidth units, the at least one resource is one resource, and time-domain starting positions of parts of the resource corresponding to different bandwidth units are identical.

5. The apparatus according to supplement 2, wherein one of the at least one resource refers to a time-frequency resource used for a complete uplink transmission.

6. The apparatus according to supplement 2, wherein the at least one resource is used for transmitting identical signals and/or channels, and the at least one piece of first indication information used for indicating the at least one resource is one piece of first indication information.

7. The apparatus according to supplement 1, wherein first transmitting unit transmits the uplink transmission according to at least one item of the following: the number of bandwidth units detected as being idle in the two or more bandwidth units; positions of bandwidth units detected as being idle in the two or more bandwidth units; whether bandwidth units detected as being idle in the two or more bandwidth units satisfy a condition; and signals and/or channels included in the uplink transmission.

8. The apparatus according to supplement 7, wherein that the first transmitting unit transmits the uplink transmission according to the at least one item includes:
    the first transmitting unit judges whether to transmit the uplink transmission according to the at least one item;
    the first transmitting unit transmits the uplink transmission if it is judged yes.

9. The apparatus according to supplement 8, wherein the apparatus further includes:
    a second receiving unit configured to receive second indication information transmitted by the network device, the second indication information being related to how the first transmitting unit judges whether to transmit the uplink transmission according the at least one item.

10. The apparatus according to any one of supplements 7-9, wherein whether the bandwidth unit detected as being idle satisfies a condition refers to:
    whether the bandwidth unit detected as being idle includes a first bandwidth unit.

11. The apparatus according to supplement 10, wherein the first bandwidth unit is a bandwidth unit in the two or more bandwidth units corresponding to channel detection based on random back-off.

12. The apparatus according to supplement 10, wherein only one of the two or more bandwidth units corresponds to the channel detection based on random back-off.

13. The apparatus according to supplement 10, wherein, the first bandwidth unit is selected by the terminal equipment before performing the channel detection, and/or the first bandwidth unit is indicated by the network device.

14. The apparatus according to supplement 7, wherein that the first transmitting unit transmits the uplink transmission according to the at least one item includes:
the first transmitting unit selects the at least one bandwidth unit from the bandwidth units detected as being idle according to the at least one item, and transmits the uplink transmission on the selected at least one bandwidth unit.

15. The apparatus according to supplement 14, wherein the first transmitting unit independently selects the at least one bandwidth unit from the bandwidth units detected as being idle according to the at least one item, and/or the first transmitting unit selects the at least one bandwidth unit from the bandwidth units detected as being idle according to the at least one item and/or the indication of the network device.

16. The apparatus according to supplement 15, wherein the apparatus further includes:
a third receiving unit configured to receive third indication information transmitted by the network device, the third indication information being related to how the first transmitting unit selects the at least one bandwidth unit from the bandwidth units detected as being idle.

17. The apparatus according to supplement 16, wherein, the first transmitting unit randomly selects the at least one bandwidth unit from the bandwidth units detected as being idle according to the third indication information; or
the first transmitting unit selects the at least one bandwidth unit including a second bandwidth unit from the bandwidth units detected as being idle according to the third indication information; or
the first transmitting unit groups and/or orders the bandwidth units detected as being idle or the two or more bandwidth units on which the channel detection is performed, and selects the at least one bandwidth unit according to the group and/or the order.

18. The apparatus according to supplement 17, wherein the second bandwidth unit is selected by the terminal equipment and/or indicated by the network device.

19. The apparatus according to supplement 7 or 14, wherein that the first transmitting unit transmits the uplink transmission according to the at least one item includes:
the first transmitting unit switches the transmitting bandwidth or does not switch the transmitting bandwidth before transmitting the uplink transmission according to the at least one item.

20. The apparatus according to supplement 19, wherein, the first transmitting unit judges whether to switch the transmitting bandwidth before transmitting the uplink transmission according to the at least one item and/or the indication of the network device and/or the capability of the terminal equipment;
and if it is judged yes, the first transmitting unit switches the transmitting bandwidth before transmitting the uplink transmission.

21. The apparatus according to supplement 20, wherein the apparatus further includes:
a fourth receiving unit configured to receive fourth indication information transmitted by the network device, the fourth indication information being related to whether the terminal equipment switches a transmission bandwidth before transmitting the uplink transmission.

22. The apparatus according to any one of supplements 1-21, wherein the at least one bandwidth unit includes one bandwidth unit, or the at least one bandwidth unit includes two or more bandwidth units which are consecutive or inconsecutive in the frequency domain.

23. The apparatus according to any one of supplements 1-22, wherein the apparatus further includes:
a second transmitting unit configured to transmit fifth indication information to the network device, the fifth indication information directly or indirectly indicating a capability of the terminal equipment, the capability directly or indirectly characterizing whether the terminal equipment supports switching the transmission bandwidth within a time range after the channel detection, and/or whether the terminal equipment supports simultaneous transmitting the uplink transmission on inconsecutive bandwidth units in the two or more bandwidth units of the carrier.

1B. An uplink scheduling apparatus, configured in a network device, wherein the apparatus includes:
a transmitting unit configured to transmit at least one piece of first indication information to a terminal equipment, the at least one piece of first indication information indicating at least one resource capable of being used for uplink transmission, the at least one resource corresponding to at least one bandwidth unit in two or more bandwidth units of a carrier in the frequency domain, and the terminal equipment performs channel detection on the two or more bandwidth units, and transmits uplink transmission on at least one bandwidth unit according to a result of the channel detection, the at least one bandwidth unit being detected as being idle.

2B. The apparatus according to supplement 1B, wherein, the at least one bandwidth unit to which the at least one resource corresponds in the frequency domain is two or more bandwidth units, the at least one resource is two or more resources, and time-domain starting positions of the at least one resource are identical;
or,
the at least one bandwidth unit to which the at least one resource corresponds in the frequency domain is two or more bandwidth units, the at least one resource is one resource, and time-domain starting positions of parts of the resource corresponding to different bandwidth units are identical.

3B. The apparatus according to supplement 1B, wherein, one of the at least one resource refers to a time-frequency resource used for a complete uplink transmission.

4B. The apparatus according to supplement 1B, wherein, the at least one resource is used for transmitting identical signals and/or channels, and the at least one piece of first indication information used for indicating the at least one resource is one piece of first indication information.

5B. The apparatus according to any one of supplements 1B-4B, wherein,
the transmitting unit further transmits second indication information to the terminal equipment, the second indication information being related to how the terminal equipment judges whether to transmit the uplink transmission.

6B. The apparatus according to any one of supplements 1B-5B, wherein,
the transmitting unit further transmits third indication information to the terminal equipment, the third indication information being related to how the terminal equipment selects the at least one bandwidth unit from the bandwidth units detected as being idle.

7B. The apparatus according to any one of supplements 1B-6B, wherein,
the transmitting unit further transmits fourth indication information to the terminal equipment, the fourth indication information being related to whether the terminal equipment switches the transmitting bandwidth before transmitting the uplink transmission.

8B. The apparatus according to any one of supplements 1B-7B, wherein the apparatus further includes:
a receiving unit configured to receive fifth indication information transmitted by the terminal equipment, the fifth indication information indicating a capability of the terminal equipment, the capability directly or indirectly characterizing whether the terminal equipment supports switching the transmission bandwidth within a time range after the channel detection, and/or whether the terminal equipment supports simultaneous transmitting the uplink transmission on inconsecutive bandwidth units in the two or more bandwidth units of the carrier.

9B. The apparatus according to any one of supplements 1B-8B, wherein the apparatus further includes:
an exchanging unit configured to exchange information with other network devices so as to coordinate resources;
the information being related to a channel detection and/or data reception and transmission method adopted by the network device and/or a terminal equipment served by the network device.

10B. The apparatus according to supplement 9B, wherein the information is used to indicate a main bandwidth unit used by the network device and/or the terminal equipment served by the network device for channel detection and/or data transmission, and/or is used to indicate whether the network device and/or the terminal equipment served by the network device support(s) switching the transmission bandwidth within a certain time range after the channel detection.

1C. An uplink scheduling apparatus, configured in a network device, wherein the apparatus includes:
a transmitting unit configured to transmit second indication information to a terminal equipment, the second indication information being related to how the terminal equipment judges whether to transmit uplink transmission, and the terminal equipment judges whether to transmit the uplink transmission according to the second indication information.

1D. An uplink scheduling apparatus, configured in a network device, wherein the apparatus includes:
a transmitting unit configured to transmit third indication information to a terminal equipment, the third indication information being related to how a terminal equipment selects at least one bandwidth unit from bandwidth units detected as being idle, and the terminal equipment selects at least one bandwidth unit from bandwidth units detected as being idle according to the third indication information, and transmits uplink transmission on the selected at least one bandwidth unit.

1E. An uplink scheduling apparatus configured in a network device, wherein the apparatus includes:
a transmitting unit configured to transmit fourth indication information to a terminal equipment, the fourth indication information being related to whether the terminal equipment switches a transmission bandwidth before transmitting the uplink transmission, and the terminal equipment switches or does not switch a transmission bandwidth before transmitting the uplink transmission according to the fourth indication information.

1F. An uplink scheduling apparatus, configured in a network device, wherein the apparatus includes:
an exchanging unit configured to exchange information with other network devices so as to coordinate resources;
the information being related to a channel detection and/or data reception and transmission method adopted by the network device and/or a terminal equipment served by the network device.

2F. The apparatus according to 1F, wherein the information is used to indicate a main bandwidth unit used by the network device and/or the terminal equipment served by the network device for channel detection and/or data transmission, and/or is used to indicate whether the network device and/or the terminal equipment served by the network device support(s) switching the transmission bandwidth within a certain time range after the channel detection.

What is claimed is:

1. An uplink transmission apparatus, configured in a terminal equipment, the apparatus including:
a memory that stores a plurality of instructions,
a receiver coupled to the memory and configured to receive first indication information indicating an uplink resource, and receive second indication information indicating the terminal equipment to transmit an uplink transmission when all bandwidth units of an uplink bandwidth part (UL BWP) are detected as being idle;
processor circuitry coupled to the memory and configured to perform channel detection on all bandwidth units of an uplink bandwidth part (UL BWP) including the uplink resource; and
a transmitter coupled to the memory and configured to transmit an uplink transmission on the uplink resource in the UL BWP when all bandwidth units of the UL BWP are detected as being idle,
wherein after a first bandwidth unit is selected, by the terminal equipment, from the bandwidth units in the UL BWP, channel detection based on random back-off is performed on the first bandwidth unit.

2. The apparatus according to claim 1, wherein that the transmitter transmits the uplink transmission includes:
the transmitter selects at least one bandwidth unit from all bandwidth units of the UL BWP detected as being idle, and transmits the uplink transmission on the selected at least one bandwidth unit.

3. The apparatus according to claim 2, wherein the transmitter autonomously selects the at least one bandwidth unit from all bandwidth units of the UL BWP detected as being idle, and/or the transmitter selects the at least one bandwidth unit from all bandwidth units of the UL BWP detected as being idle according to an indication of a network device.

4. The apparatus according to claim 3, wherein,
the receiver further receives third indication information transmitted by the network device, the third indication information being related to how the transmitter selects the at least one bandwidth unit from all bandwidth units of the UL BWP detected as being idle.

5. The apparatus according to claim 4, wherein,
the transmitter randomly selects the at least one bandwidth unit from all bandwidth units of the UL BWP detected as being idle according to the third indication information; or
the transmitter selects the at least one bandwidth unit including a second bandwidth unit from all bandwidth units of the UL BWP detected as being idle according to the third indication information; or
the transmitter, according to the third indication information, groups and/or orders all bandwidth units of the UL BWP detected as being idle, and selects the at least one bandwidth unit according to grouping and/or order.

6. The apparatus according to claim 5, wherein the second bandwidth unit is selected by the terminal equipment and/or indicated by the network device.

7. The apparatus according to claim 2, wherein the at least one bandwidth unit includes one bandwidth unit, or the at least one bandwidth unit includes two or more bandwidth units which are consecutive or inconsecutive in frequency domain.

8. The apparatus according to claim 1, wherein that the transmitter transmits the uplink transmission includes:
the transmitter switches a transmission bandwidth or does not switch a transmission bandwidth before transmitting the uplink transmission.

9. The apparatus according to claim 1, wherein
the transmitter further transmits fifth indication information to a network device, the fifth indication information directly or indirectly indicating a capability of the terminal equipment, the capability directly or indirectly characterizing whether the terminal equipment supports switching the transmission bandwidth within a time range after the channel detection, and/or whether the terminal equipment supports simultaneous transmitting the uplink transmission on inconsecutive bandwidth units in all bandwidth units of the UL BWP.

10. The apparatus according to claim 1, wherein,
the second indication information being related to how the terminal equipment judges whether to transmit the uplink transmission.

11. An uplink scheduling apparatus, configured in a network device, the apparatus including:
a transmitter configured to transmit first indication information and second indication information to a terminal equipment, the first indication information indicating an uplink resource, the second indication information indicating the terminal equipment to transmit an uplink transmission only when all bandwidth units of an uplink bandwidth part (UL BWP) are detected as being idle, and
the terminal equipment performs channel detection on all bandwidth units of an UL BWP including the uplink resource, and the terminal equipment transmits an uplink transmission on the uplink resource in the UL BWP when all bandwidth units of the UL BWP are detected as being idle,
wherein after a first bandwidth unit is selected, by the terminal equipment, from the bandwidth units in the UL BWP, channel detection based on random back-off is performed on the first bandwidth unit.

12. The apparatus according to claim 11, wherein,
the second indication information being related to how the terminal equipment judges whether to transmit the uplink transmission.

13. The apparatus according to claim 11, wherein,
the transmitter further transmits third indication information to the terminal equipment, the third indication information being related to how the terminal equipment selects at least one bandwidth unit from all bandwidth units of the UL BWP detected as being idle.

* * * * *